(12) United States Patent
Beele

(10) Patent No.: US 8,393,121 B2
(45) Date of Patent: Mar. 12, 2013

(54) FIRE-STOP SYSTEM FOR PLACEMENT IN A CONDUIT THROUGH WHICH A THERMALLY WEAKENABLE PIPE EXTENDS, METHOD FOR PLACING THE SYSTEM AND CONDUIT PROVIDED WITH SUCH A SYSTEM

(75) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 264 days.

(21) Appl. No.: 12/680,834

(22) PCT Filed: Jan. 16, 2009

(86) PCT No.: PCT/EP2009/050499
§ 371 (c)(1),
(2), (4) Date: Aug. 3, 2010

(87) PCT Pub. No.: WO2009/090247
PCT Pub. Date: Jul. 23, 2009

(65) Prior Publication Data
US 2010/0294519 A1   Nov. 25, 2010

(30) Foreign Application Priority Data
Jan. 16, 2008 (GB) .................................. 0800765.0

(51) Int. Cl.
*E04C 2/52* (2006.01)
*A62C 2/00* (2006.01)

(52) U.S. Cl. .......... 52/220.8; 52/220.1; 52/317; 52/232; 169/45

(58) Field of Classification Search ................. 52/220.8, 52/220.1, 317, 232; 169/45
See application file for complete search history.

(56) References Cited

U.S. PATENT DOCUMENTS

| 4,424,867 | A | * | 1/1984 | Mallow | 169/43 |
| 5,344,106 | A | * | 9/1994 | Beele | 248/56 |
| 5,452,551 | A | * | 9/1995 | Charland et al. | 52/232 |
| 5,498,466 | A | * | 3/1996 | Navarro et al. | 428/408 |
| 5,548,934 | A | * | 8/1996 | Israelson | 52/220.8 |
| 5,953,872 | A | * | 9/1999 | MacMillian et al. | 52/220.8 |
| 6,470,635 | B2 | * | 10/2002 | Cornwall | 52/220.8 |
| 7,877,941 | B2 | * | 2/2011 | Fischer et al. | 52/220.8 |
| 8,146,305 | B2 | * | 4/2012 | Cordts | 52/220.8 |
| 2002/0032996 | A1 | * | 3/2002 | Cornwall | 52/220.8 |
| 2003/0009961 | A1 | * | 1/2003 | Radke et al. | 52/220.1 |
| 2003/0192269 | A1 | * | 10/2003 | Radke et al. | 52/220.8 |
| 2004/0016190 | A1 | * | 1/2004 | Radke et al. | 52/232 |
| 2004/0093815 | A1 | * | 5/2004 | Cordts | 52/232 |

FOREIGN PATENT DOCUMENTS

JP   2004313393 A   11/2004

* cited by examiner

*Primary Examiner* — Mark Wendell
(74) *Attorney, Agent, or Firm* — Wolf, Greenfield & Sacks, P.C.

(57) ABSTRACT

A thermally expandable fire-stop system for placement in a thermally stable conduit having an inner wall defining an inner space through which a single pipe, being a, relatively, thermally weakenable pipe having an outer wall, extends, or will extend, the system comprising at least a device which includes at least one component having a non-linear thermal expansion characteristic.

24 Claims, 31 Drawing Sheets

Figure 1:
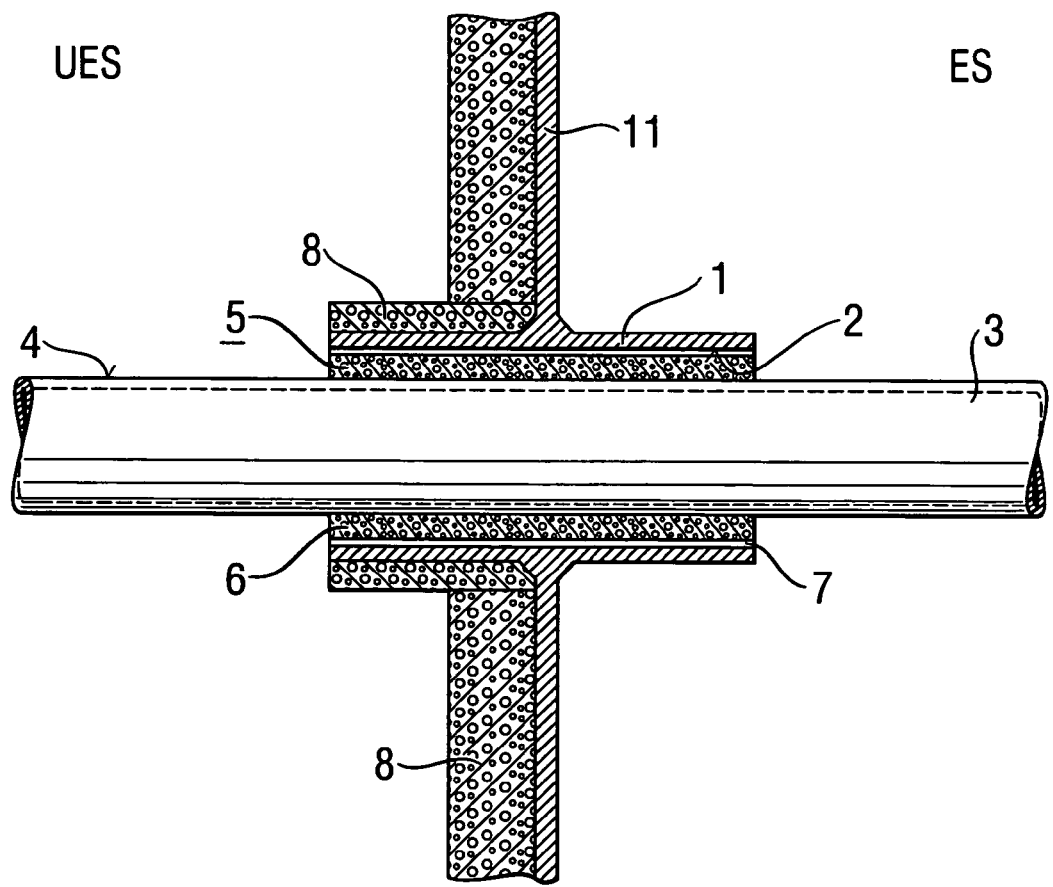

FIRE-STOP SYSTEM FOR PLACEMENT IN A CONDUIT THROUGH WHICH A THERMALLY WEAKENABLE PIPE EXTENDS, METHOD FOR PLACING THE SYSTEM AND CONDUIT PROVIDED WITH SUCH A SYSTEM

INTRODUCTION

The invention is related to a thermally expandable fire-stop system for placement in a rigid and thermally stable conduit having an inner wall defining an inner space through which a single pipe or a single bundle of pipes extends, or will extend. Each pipe is a, relatively, thermally weakenable pipe. The invention is further related to a rigid and thermally stable conduit having an inner wall through which a single pipe, or a single bundle of pipes, extends, or will extend. Each pipe is a, relatively, thermally weakenable pipe having an outer wall, wherein the conduit includes a thermally expandable fire-stop system. The invention is further related to a method for providing a fire-stop system in a rigid and thermally stable conduit having an inner wall defining an inner space, through which a single pipe, or a single bundle of pipes, extends or will extend. Each pipe is a, relatively, thermally weakenable pipe,

BACKGROUND OF THE INVENTION

Conduits are normally incorporated in a construction element that divides, for instance, two compartments. Such a construction element may also be referred to as a partition. A pipe may extend through the conduit from one of the two compartments into the other. These conduits are often referred to as pipe penetrations or transit systems. Such a conduit is often present in constructions formed on the basis of civil engineering. Factories, buildings, drainage systems, tunnels, subways, etc. all comprise such penetrations. However, also constructions formed on the basis of nautical engineering do comprise such conduits. One finds them on board of vessels and/on other offshore applications such as oil rigs.

These penetrations are seen as unwelcome necessities in such a construction. Pipes for, for instance, water distribution and water wastage systems, air-conditioning systems, hydraulic and pneumatic control, sprinklers etc but also for transport of gas, or oil, need to be extending throughout such a construction, even though this entails introducing weak spots in a separation of the compartments.

Such weak spots do not manifest themselves to a great extent in the mechanical strength of the construction but much more in the possibility of undesired transport of physical phenomena throughout the structure.

An example is a fire which itself needs to be confined, as long as possible, to only one area. This is important not only to allow for control and extinguishing the fire, but also to provide time for people present in compartments near to the fire for reaching a safe distance from the fire before it further expands. To prevent smoke and/or fire from passing through the conduit from one compartment to another, the conduit is usually provided with a material that closes the conduit, at least for some time, when the conduit is exposed to heat due to a nearby fire.

Another form of transport that needs to be prevented is the supply of air to a fire which takes place in a compartment. Particularly for on-shore constructions, it is believed that fire is fed with oxygen as supplied through burned-out conduits and that it spreads itself throughout a multi-storey building, if transport of air can freely occur between different levels of compartments. It is also for this reason desirable that a conduit is closed off, when on one side of the conduit a fire takes place.

Although above reference is made to a construction element having a conduit and dividing two compartments, it is also possible that a construction element separates a compartment from the surrounding environment. It is thus possible that one side of the construction element is exposed to atmospheric conditions.

It will be appreciated that a pipe extending through a conduit, the conduit itself and the construction element into which the conduit is incorporated, may each be made of a material that allows for the conduction of heat. The efficiency for conducting heat depends on the type of material and the dimensions of that material. In principle, heat can in such a situation be supplied to the inner space of the conduit via at least two different routes. The first route is via the pipe extending through the conduit and the second route to the inner space of the conduit is via the material out of which the conduit itself is made. As in offshore constructions and vessels, conduits are usually made of metal, i.e. a good heat-conducting material, heat is usually rapidly supplied to the inner space of the conduit via the second route. Of course, heat may also exclusively be applied to the inner space of the conduit via the first route, in a situation where the partition is for instance a concrete wall and the conduit is formed by a through-hole in that wall.

There is a strong tendency in both the offshore and the on-shore construction industry to make pipes, in particular pipes of so-called service systems as referred to above, of a plastic material such as for instance PVC, PP-R, ABS and HOPE. Relative to aluminium or metal pipes, such plastic pipes offer an enormous reduction in weight, clearly advantageous in shipbuilding. As known, plastics are not susceptible and do not contribute to corrosion, advantageous in both the offshore and on-shore construction industry. Such plastic pipes are observed to suffer much less from sedimentation in the pipes, particularly when compared to steel pipes, giving plastic pipes advantages in waste water installations. On exposure to heat, however, such plastic pipes may weaken, i.e. become soft, and are therefore further in this specification referred to, as made of a thermally weakenable or a thermally softenable material, or in short as thermally weakenable pipes. The phrase thermally weakenable material refers thus in general to materials comprising or consisting of plastic. However, it is envisagable that also pipes made of or made with fibreglass form thermally weakenable material and these are therefore equally embraced by the term thermally weakenable pipes.

It will be clear that such weakening of the pipe will occur more rapidly in a conduit which is made of metal and incorporated in a metal construction element or partition. The conduit will then act as a kind of oven surrounding the pipe of the weakenable material, leading to local collapse of the pipe. However, a heated inner wall of a through-hole in a stone or concrete wall which is exposed to a fire, may equally act like an oven, even though the heating-rate will in that case be different than the heating-rate for "the metal oven". A stone or concrete wall will absorb much more heat and is a poor conductor of heat. The second route for the supply of heat into the conduit is in that case therefore much less effective. In such a situation it may well be that the first route, i.e. transport of heat into the conduit via the pipe itself, is by far the most dominant route if not effectively the only one.

It is common practice to seal the space between a conduit and a pipe as extending through the conduit, with a sealing system. Such a sealing system may provide sealing capacities before exposure to heat, and may for instance seal such that gas and/or water cannot penetrate through the annular space between the pipe and the conduit.

In particular for conduits through which a single pipe of a thermally weakenable material extends, advanced sealing systems have been developed. Reference is made to EP 120 075.9 31of the same inventor, describing so-called "crusher plugs". At each end of the conduit is a plug inserted in the annular space between the conduit and the pipe extending to the conduit. The crusher plug is made of a thermally expandable material. Upon exposure to heat, the crusher plug expands. However, as the conduit is of a very rigid material, expansion is only possible radially inwards. As upon the exposure to heat the thermally weakenable pipe has started weakening, the radial inward expansion of the plug crushes the pipe further and therewith closes the pipe off, as well as the complete conduit. The use of such plugs is very advantageous for conduits through which a single pipe extends, as the annular space which needs to be shut off by the plug is very well defined.

WO 2006/097290, also of the present inventor, discloses a conduit through which a plurality of pipes extend. For sealing that conduit a system is described that comprises a multitude of heat expandable rubbery sleeves. The sleeve material is made heat expandable by incorporation of heat expandable graphite into the rubbery material. Such a sleeve is also referred to as a filler sleeve. Usually, the sleeve is easily bendable, soft, and has relatively poor mechanical properties. This makes the sleeves perfect for inserting in a conduit and therewith filling the conduit. The sleeves are applied in a fashion parallel to each other and parallel to the pipe. The system further comprises a fire-resistant and/or watertight sealant. The sealant is applied against the ends of the sleeves and forms a sealing layer that seals off the conduit.

A system as described in WO 2006/097290 is usually applied in a conduit which is very large in cross-section relative to the cross-section of the pipe extending through the conduit. The main reason for this is that there has to be enough space in the conduit for filling the conduit with the heat expandable rubber sleeves, so that these heat expandable sleeves are during expansion in radial (transverse) direction capable of closing the conduit fully off. As there is space between the filler sleeves as well as in each empty sleeve, thermal expansion can freely occur in the radial (transverse) direction as soon as the temperature in the conduit reaches a point from where the thermally expandable rubber material will expand.

Although there is in axial (longitudinal) direction per unit of length between the sealant layers, no space for expansion available, and the expansion is expected to be larger in axial direction than in radial direction given the amount of heat expandable material that is axially aligned, the expansion of the filler sleeves is initially still predominantly radially oriented.

Without wishing to be bound by any theory this is thought to be a result of three factors. Firstly, as soon as thermal expansion occurs, even though at low temperatures and therefore still only to a limited extent, the axially expanding sleeves feel constrained between the sealant layers and start buckling, therewith removing pressure on the inner wall of the sealant layers. Secondly, the expansion will find its way radially given the little resistance the expansion experiences on radially expanding. (Remember, space is available radially, not only due to the space in and between the sleeves, but at higher temperatures also due to the weakening pipe within the conduit). Thirdly, air originally trapped in the conduit and reaching a high pressure due to the raised temperature and volume reduction in the conduit, will at some stage find its way out presumably through small cracks which have become available in the sealant layer without a breaking up of the sealant layer. This escaping of air offers "new volume" made available in the conduit, into which the expanding sleeve layers can expand into, whilst staying within the confinement of the conduit and the sealant layers.

At some stage, the expanding forces in the conduit as restrained by the sealant layers become so high that the sealant layer breaks.

This breaking is then in itself not a problem as the expanded sleeves have sealed off the conduit before the sealant layer breaks.

Currently there is a strong desire to have smaller and shorter conduits, in order to save both weight and space, without compromising sealing capacity both before and during exposure to a fire.

Conduits which are smaller in cross-sectional dimensions do have little capacity for letting the onset of expansion of the filler sleeve material to predominantly take place in radial direction. In such conduits, it is the radial expansion which is constrained. Hence, the expansion will at a much earlier stage attempt to find its way axially, resulting in early breaking of the sealant layer, with a possibility that the sealant layer breaks before the conduit has been fully closed off by the expanding material. In such a situation it is needed to apply instead of a sealant layer a much stronger "structure". In response thereto one applies in practice a plug designed to sustain high pressures rather than a sealant layer. It turns out that a conduit with expandable filler sleeve in the annular gap between the conduit and the pipe extending therethrough, on both ends of the conduit closed off by a deeply inserted plug, effectively allows the filler sleeves to expand radially and close the conduit and pipe fully off.

However, the drive for further reduction of the cross-sectioned area of the conduit relative to the pipe, continues in attempts to save even more space and even more weight.

When the annular gap between the conduit and the pipe becomes very small, a plug cannot be inserted and can thus not offer resistance against axial expansion of the tiller sleeve material. The situation becomes even worse when the pipe is slightly off-centre relative to the conduit.

On the market is a system available that comprises two steel collar-shaped casings filled with relatively thin, usually wrappable sheets of rubbery heat expandable material. Each of these casings is mountable in front of the conduit around the pipe and against the partition to provide resistance against axial expansion of the heat expandable material and to force the expansion to direct itself radially inward so as to close the pipe (and ideally also the conduit) fully off upon exposure to heat. Such a system has many drawbacks. First, it requires two extra mounting steps (one casing on each side of the partition) and facilities for mounting at parts of the partition "surrounding" the conduit. Secondly, the space saved in cross-sectional direction is to some extent lost due to the need to mount these to the parts of the partition surrounding the conduit. Thirdly, the casings itself require space, so that in axial direction the conduit or the penetration effectively has become longer instead of shorter.

It is an object of the invention to provide a thermally expandable fire-stop system for application in combination with a rigid and thermally stable conduit having an inner wall defining an inner space through which a pipe, being a, relatively, weakenable pipe, extends, or will extend.

It is an object of the invention to provide a rigid and thermally stable conduit having an inner wall through which a pipe, being a, relatively, thermally weakenable pipe having an outer wall, extends, or will extend, such that it includes a thermally expandable fire-stop system in an economically attractive way.

It is an object of the invention to provide a method for providing a fire-stop system in a rigid and thermally stable conduit having an inner wall defining an inner space through which a pipe, being a, relatively, thermally weakenable pipe, extends or will extend.

SUMMARY OF THE INVENTION

The invention provides a thermally expandable fire-stop system as referred to above when indicating the objects of the invention. The system according to the invention comprises at least a device which includes at least one component having a non-linear thermal expansion characteristic. The device is concentrically positionable around a pipe such that, after completed placement of the system and before onset of the non-linear thermal expansion of the device, hot gas can from outside the conduit enter a gas-entrance space between the device and an inner wall of the conduit, between the outer wall of the pipe and the device, or through the device. This system offers a surprising effect.

Hot gas, as present when nearby a fire takes place, is likely to be the first medium for transporting heat toward the conduit. As this hot gas can enter the conduit when entering the gas entrance space, the walls defining the gas-entrance space will be heated up. At least one of these walls will be a wall belonging to the device which includes the at least one component having a non-linear thermal expansion characteristic. This device then heats up, expands a little, not necessarily already in the non-linear fashion, and/or melts due to the heat passed on from the hot gas to the device wall.

As a consequence thereof, the device fixes itself within an annularly-shaped space between the inner wall of the conduit and the outer wall of the pipe. This fixing takes place, presumably by a combination of thermal expansion and/or gluing as a result of the molten device wall. An advantage is that the device not necessarily needs to be pre-fixed within the conduit.

Also, significantly, the ends of the conduit do not necessarily need to be sealed off by a sealant. A related advantage of this system is that the system can be installed into the conduit, even when access to the conduit is only available at one side of the conduit.

Further, very advantageously, it has turned out that once the device has fixed itself against the inner wall of the conduit and the outer wall of the pipe, and further exposure to heat takes place, the expansion in an axial direction of the conduit is inhibited. Without wishing to be bound by any theory, this is believed to be due to the fixation to the pipe and the inner wall of the conduit. As a result thereof, the expansion occurs predominantly radially, which becomes then also possible as the pipe starts weakening due to exposure to heat and as such gives way to the now rapidly and forcefully radially inward expanding device, which has by then reached a temperature range in which it displays its non-linear expansion behaviour.

It has further turned out that it is possible that a part of the device, in the conduit situated towards the "cooler" end of the conduit, i.e. the end not directly exposed to the enormous heat, is not only not immediately affected by the heat, but also for at least some time further blocked off from exposure to heat. As soon as a part of the device closer to the heat source fixes itself within the conduit against the inner wall of the conduit and the outer wall of the pipe, the gas entrance space is effectively blocked off. So, hot gas will not, or no longer arrive at the end of the device situated in a part of the conduit that is not directly already exposed to the intense source of heat. The part of the device exposed to the heat, and responding thereto with the described non-linear thermal expansion, will form insulation, so that the pipe at the unexposed side remains relatively cool.

The invention further provides a conduit as described above where the objects of the invention are discussed. The inner space of the conduit includes a system as described above, providing the conduit also with the advantages offered by the system. The conduit can be relatively small in transverse cross section and relatively short in length, an advantage in both off-shore and on-shore applications.

The invention further provides a method as referred to above where the objects of the invention are discussed. The method includes: positioning in the inner space a thermally expandable device which includes at least one component having a non-linear thermal expansion characteristic; positioning the device concentrically relative to the inner space for concentrically surrounding the pipe; and positioning the device such that before onset of the non-linear thermal expansion of the device, hot gas can enter a gas entrance space between the device and the inner wall of the conduit, between the outer wall of the pipe and the device, or through the device.

Advantages discussed above for the system, equally apply to performing this method.

Figure 2:
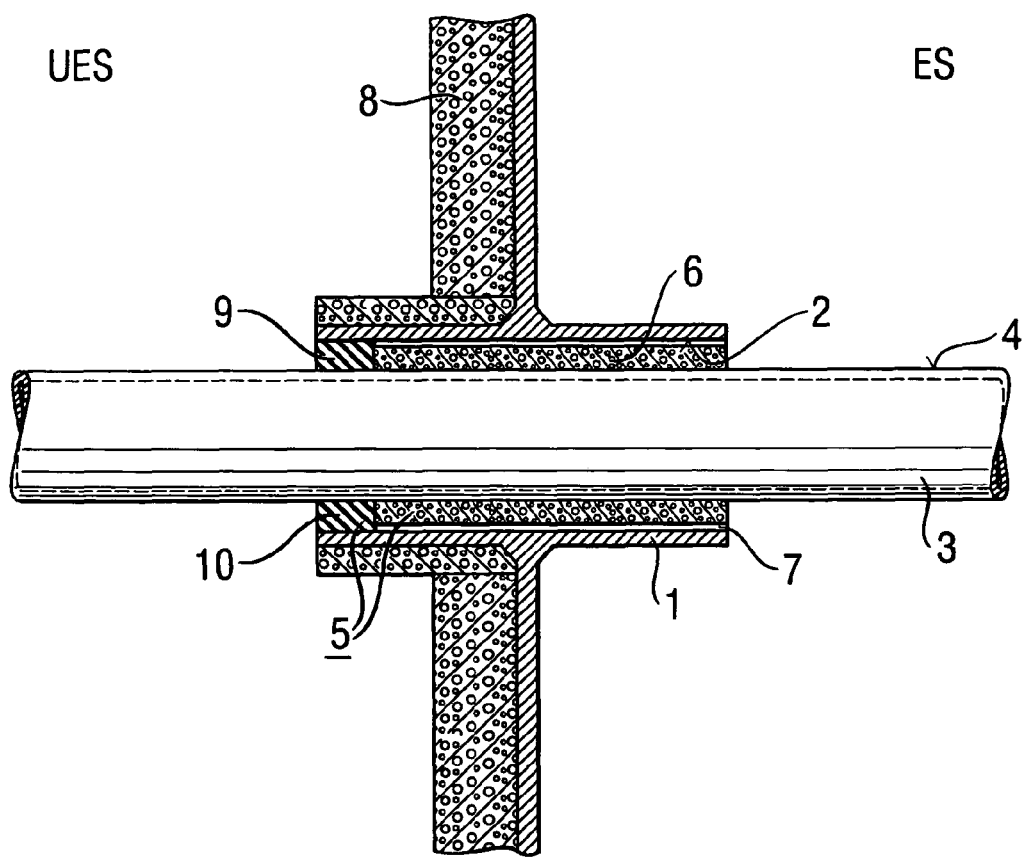
Figure 3:
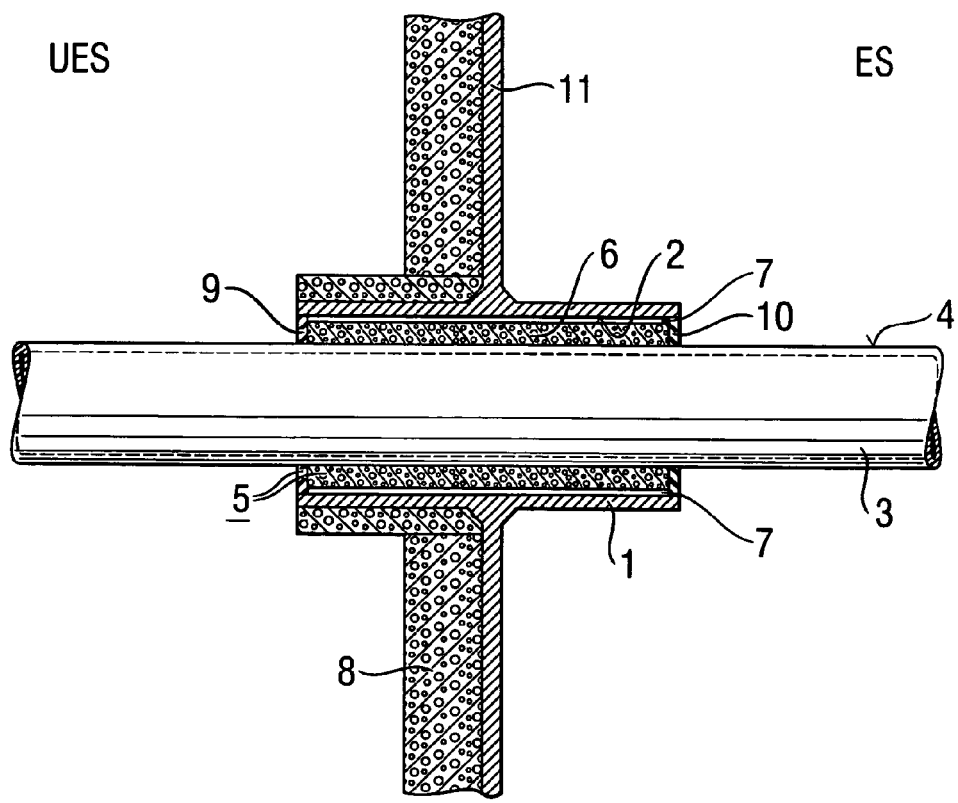
Figure 4:
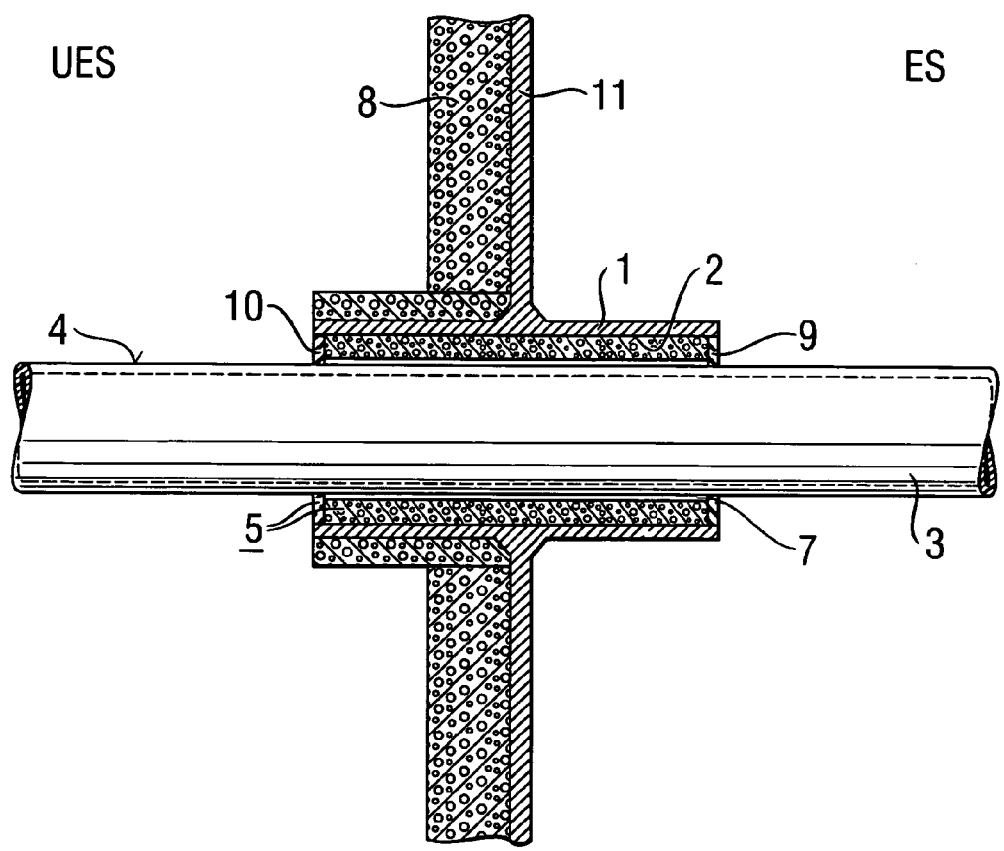
Figure 5:
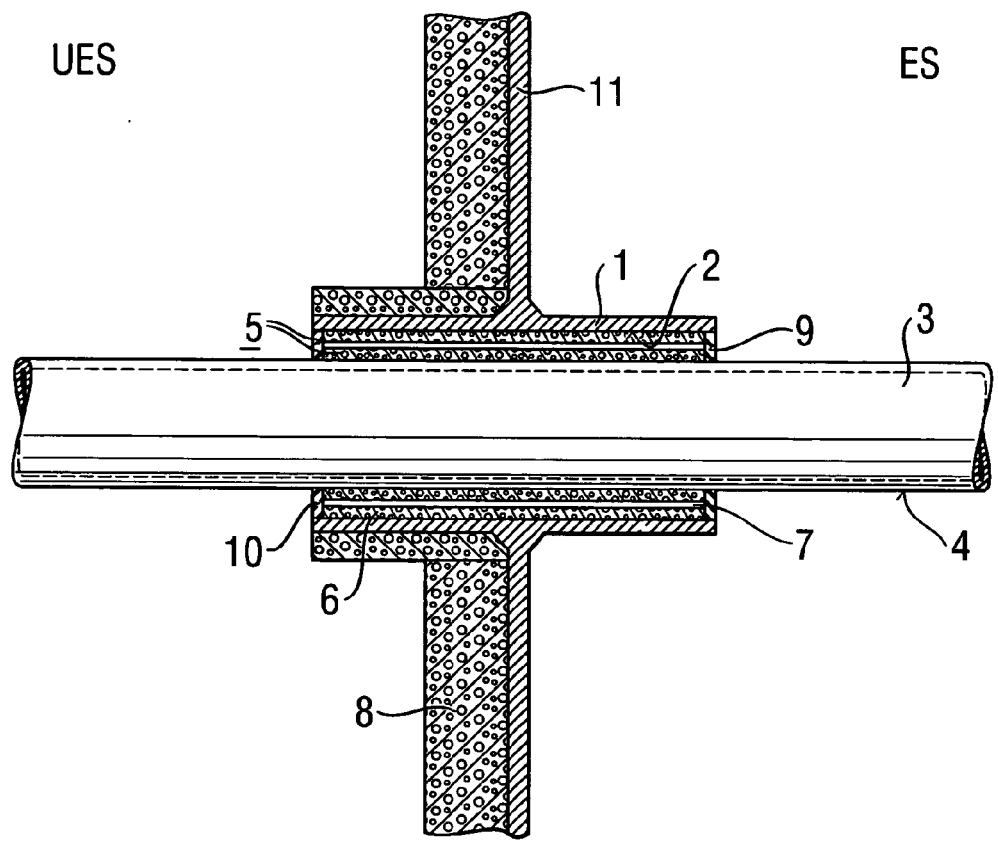
Figure 6:
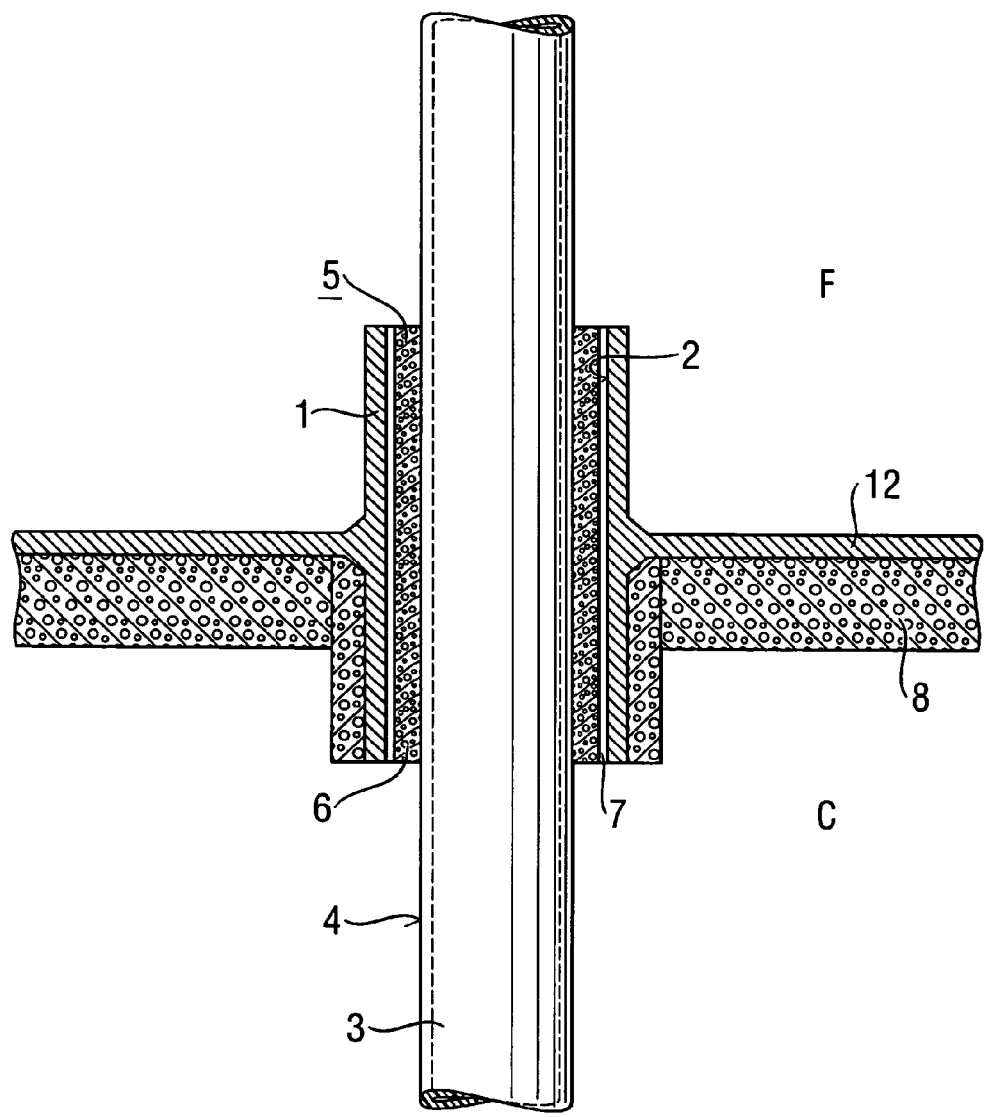
Figure 7:
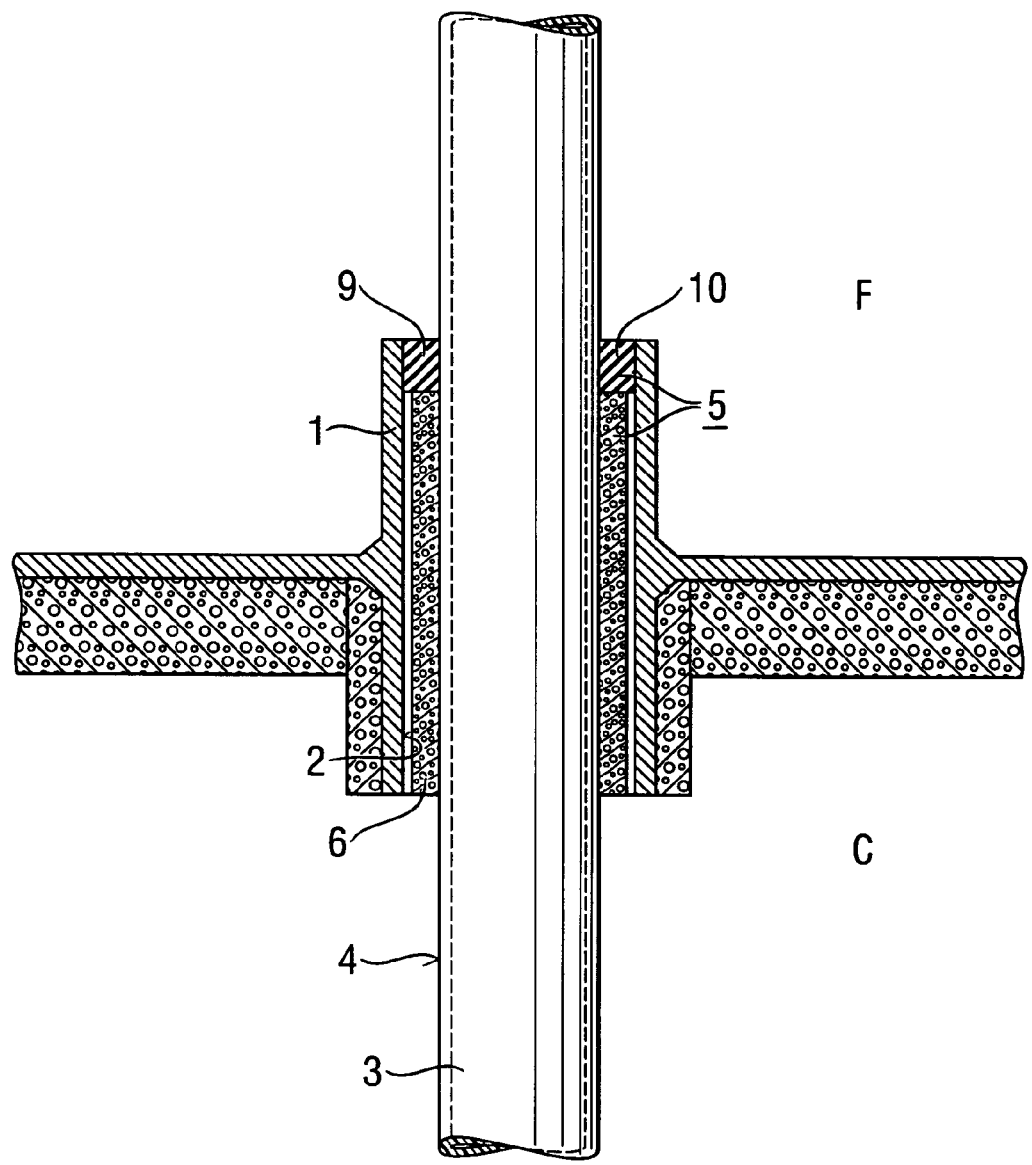
Figure 8:
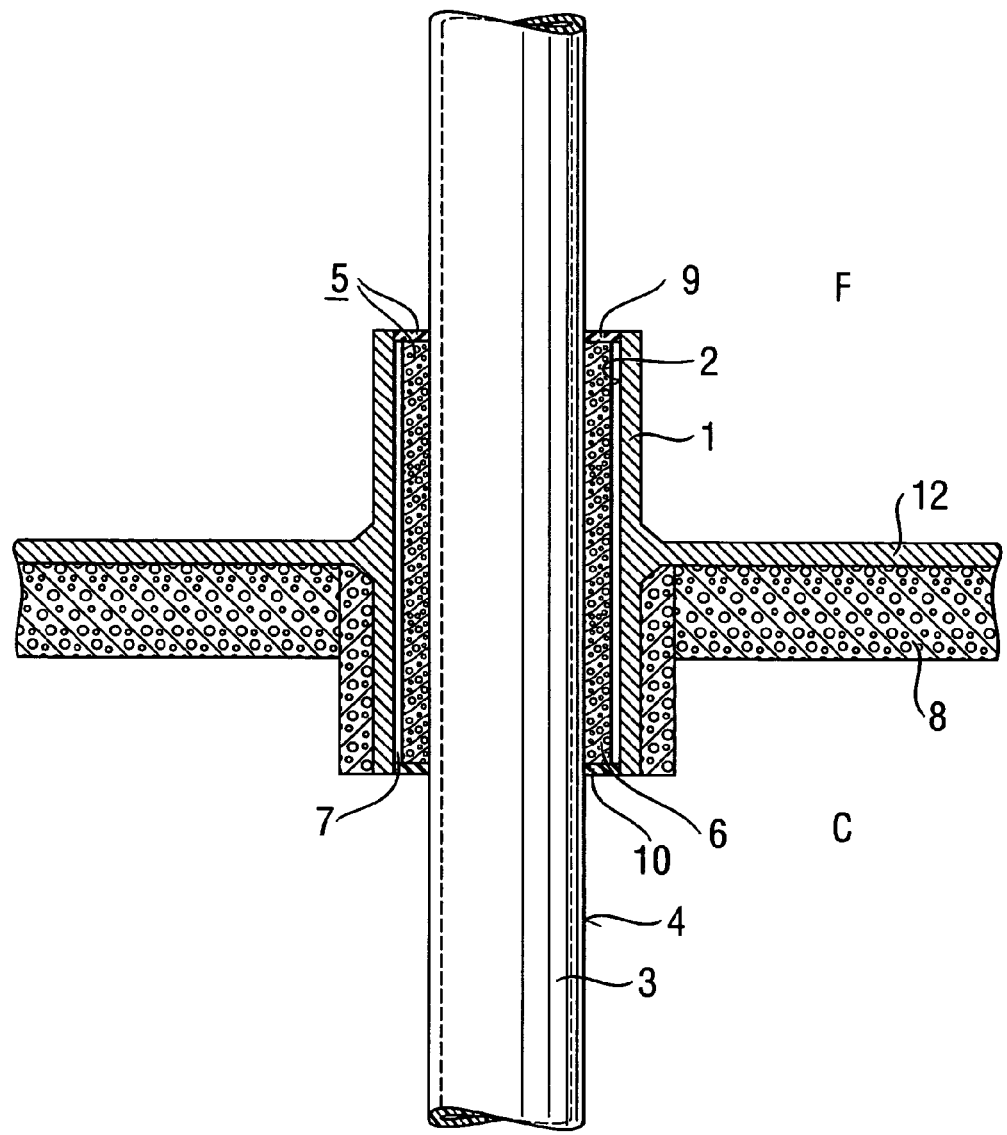
Figure 9:
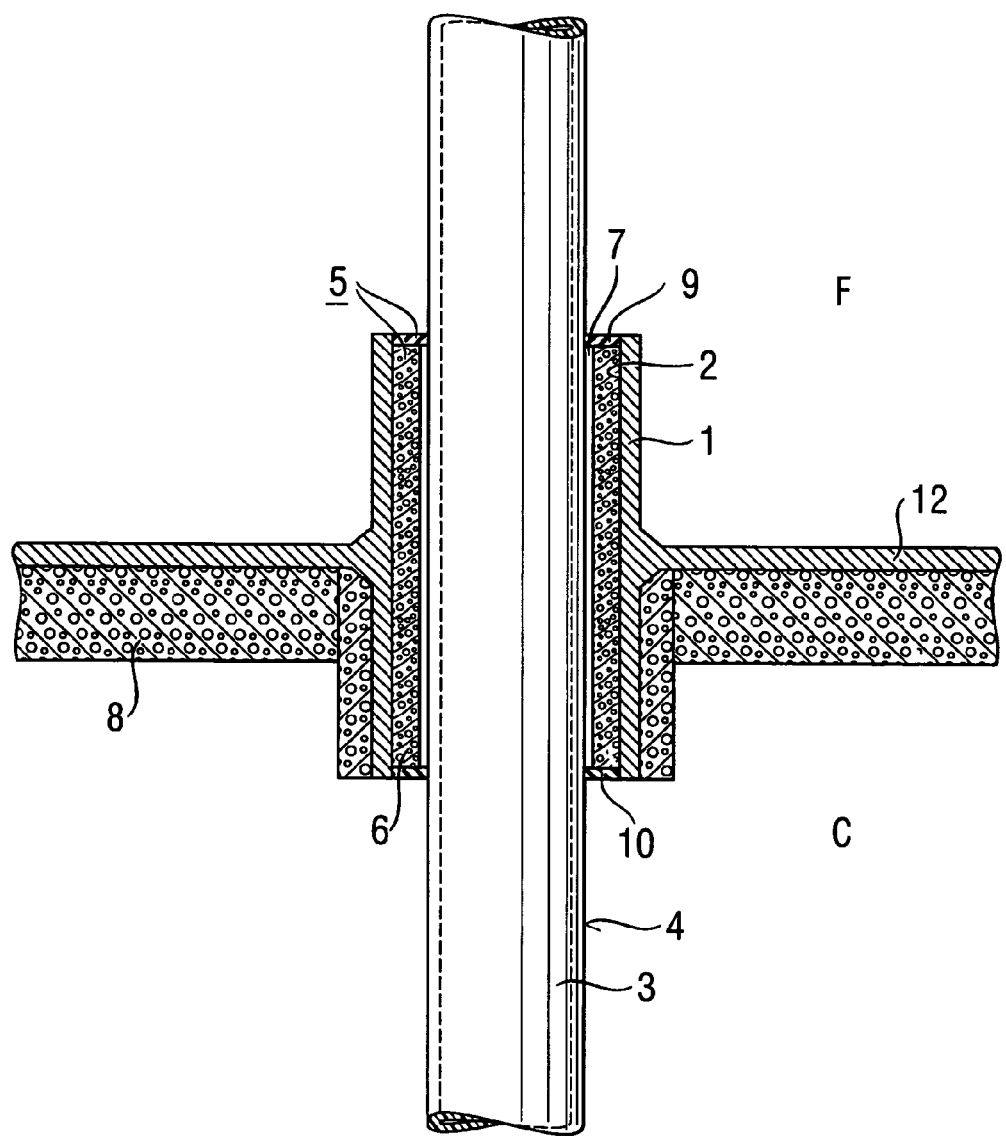
Figure 10:
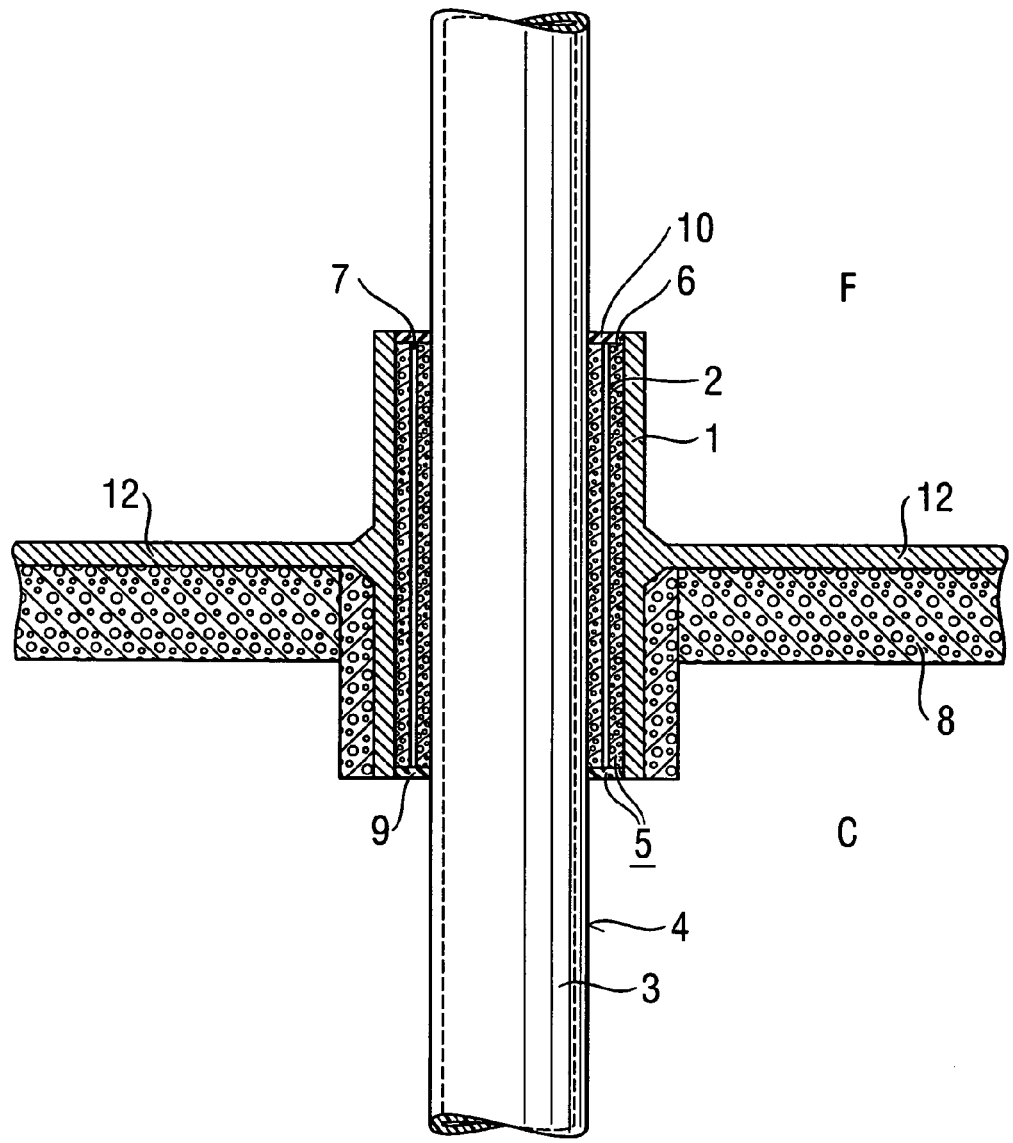
Figure 11:
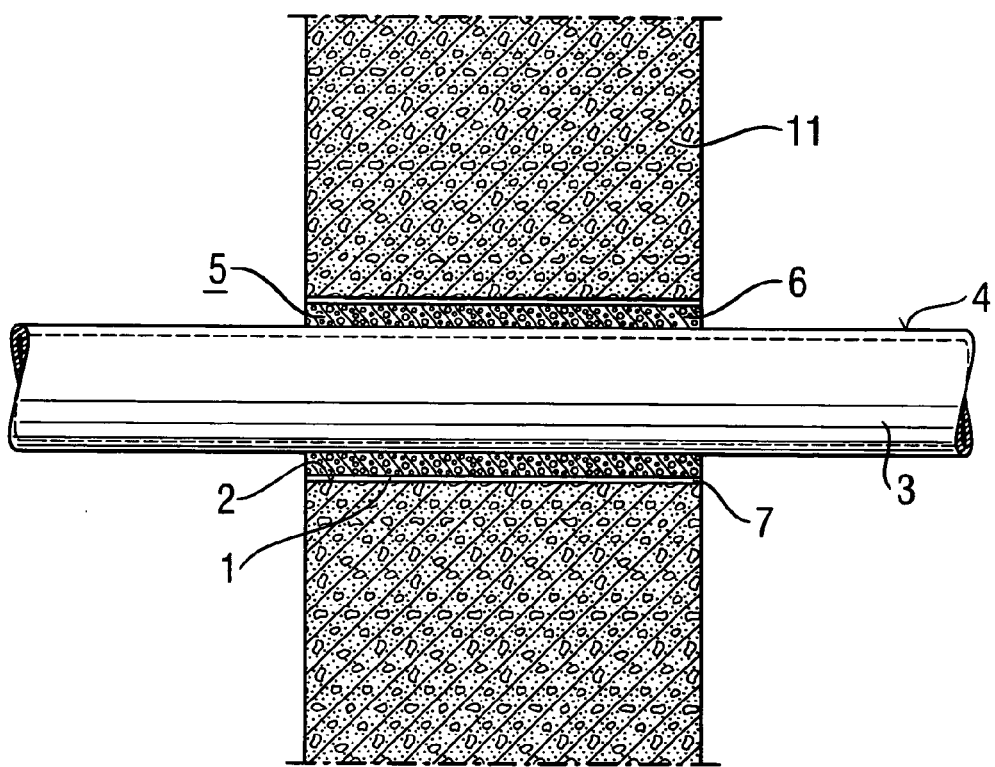
Figure 12:
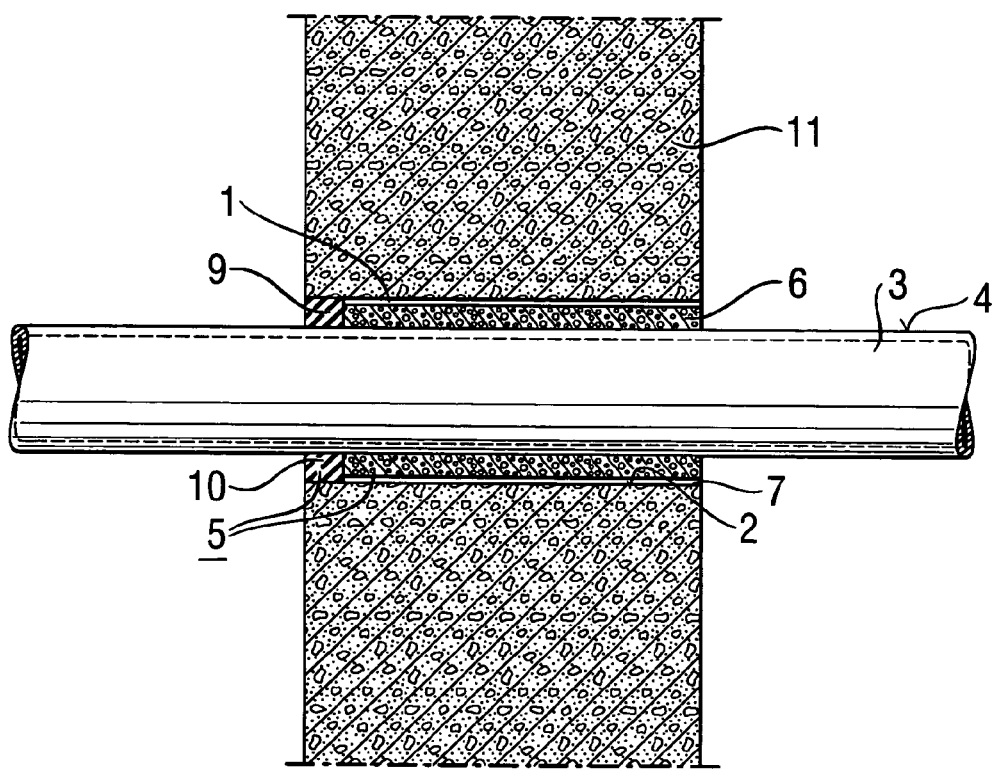
Figure 13:
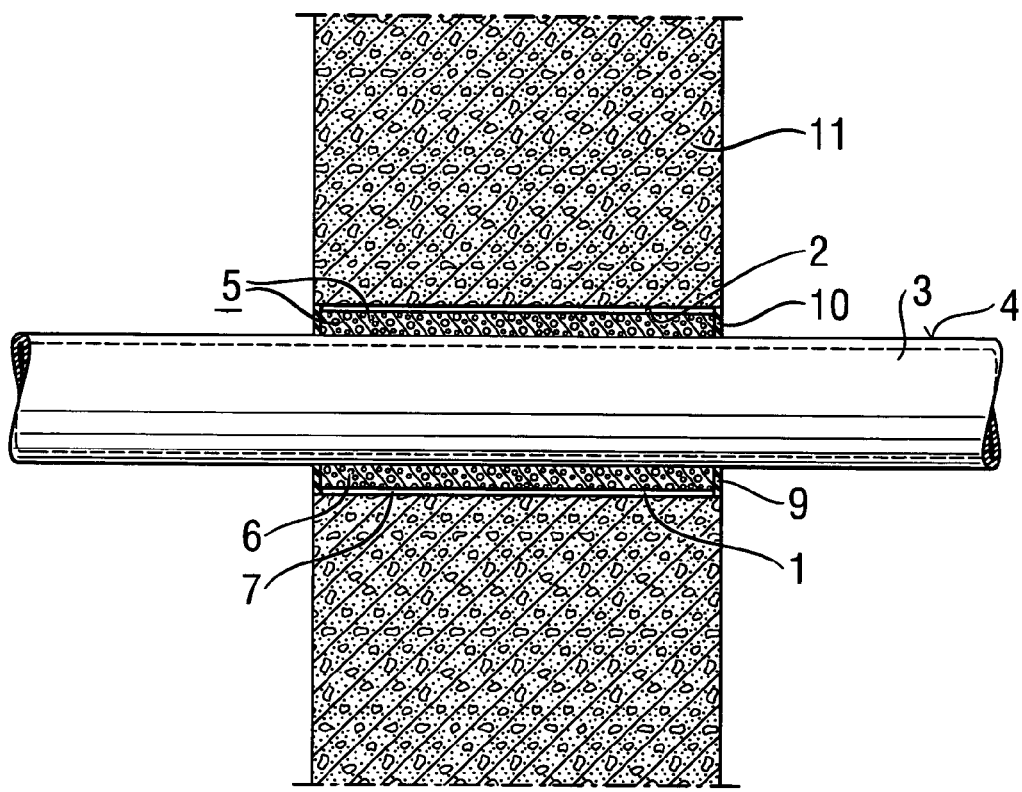
Figure 14:
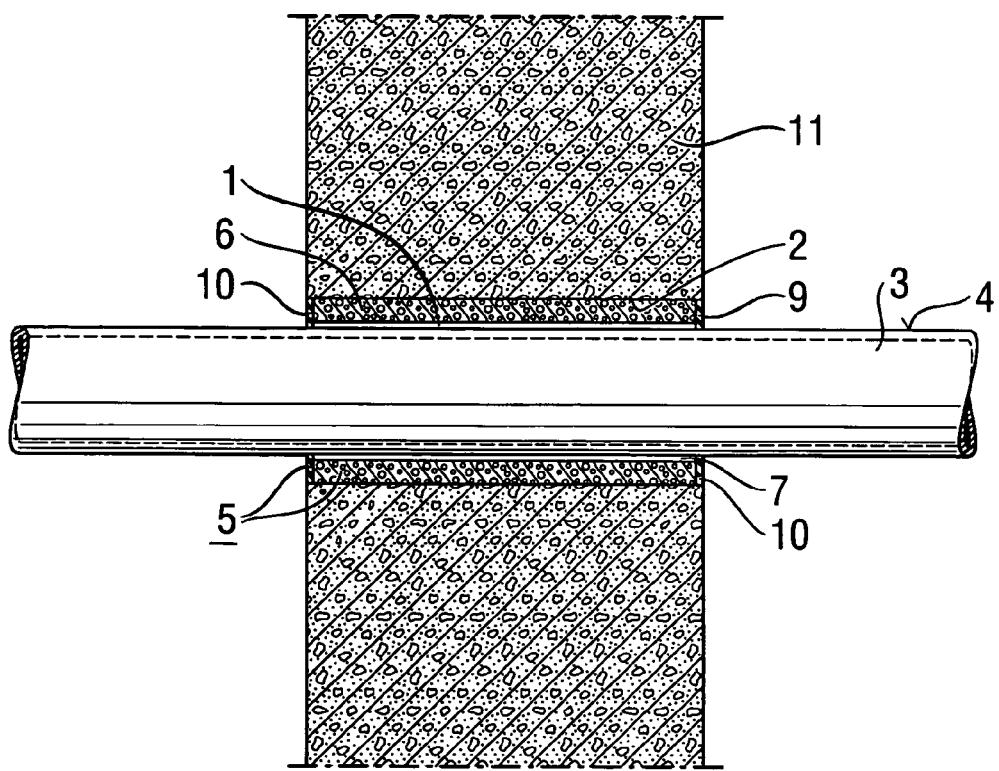
Figure 15:
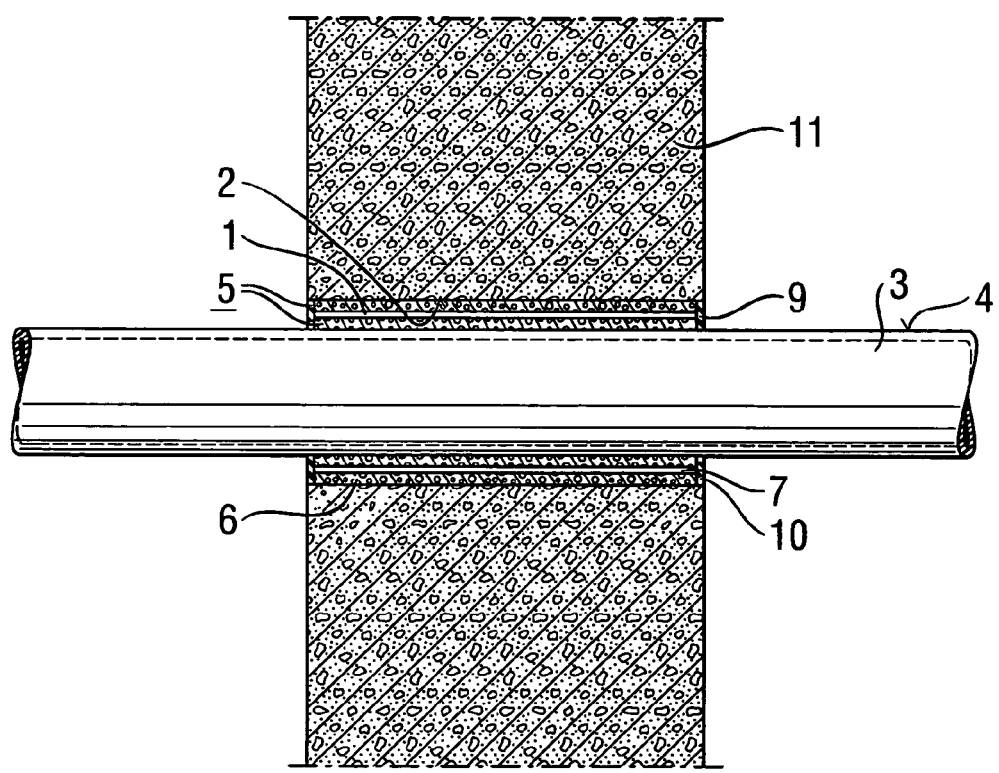
Figure 16:
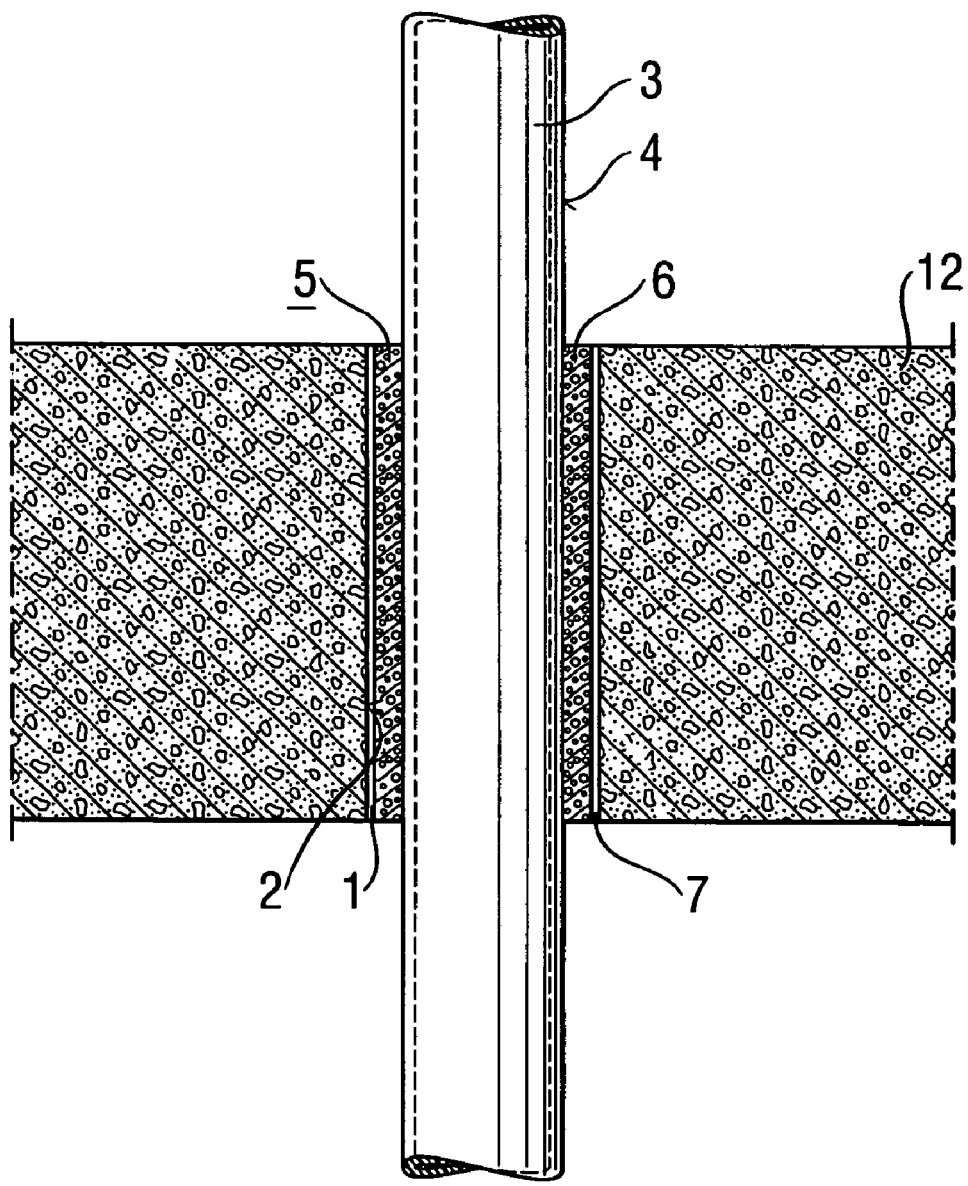
Figure 17:
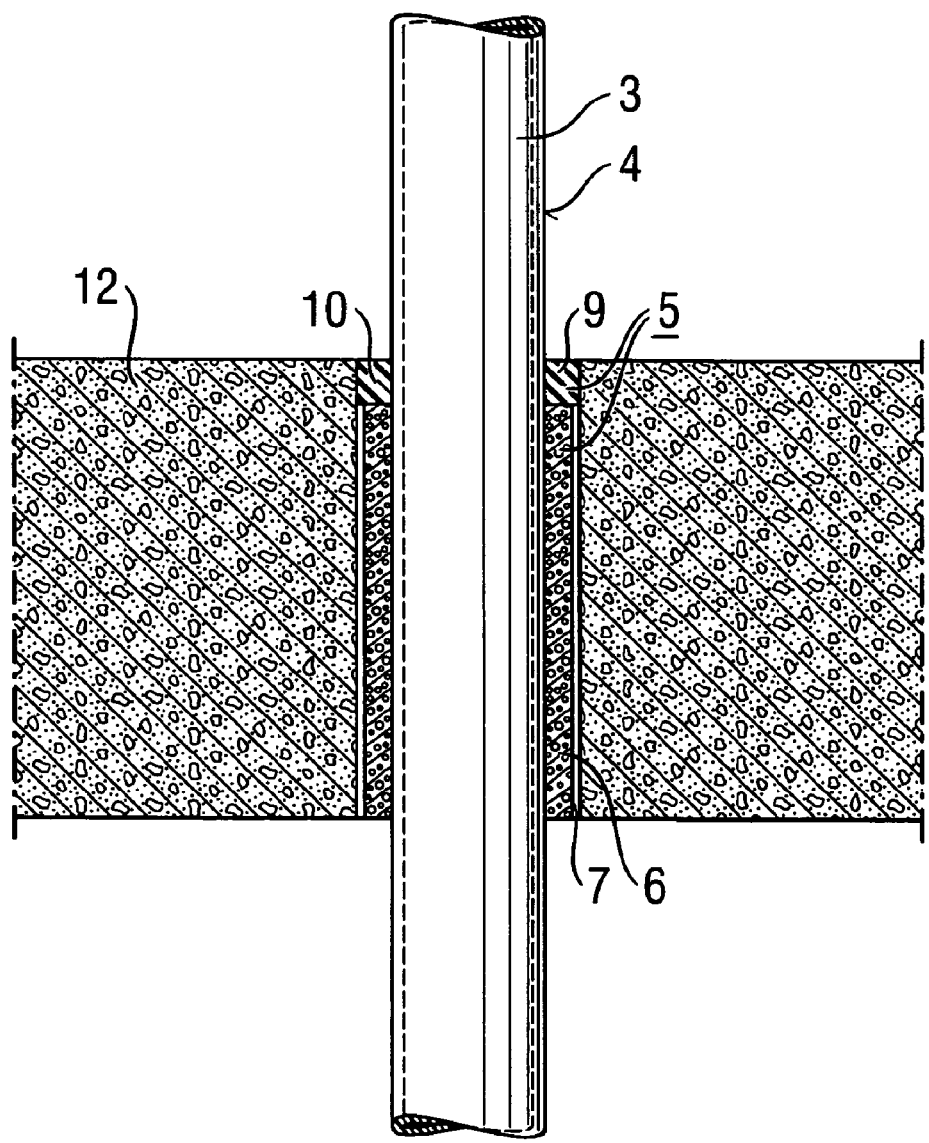
Figure 18:
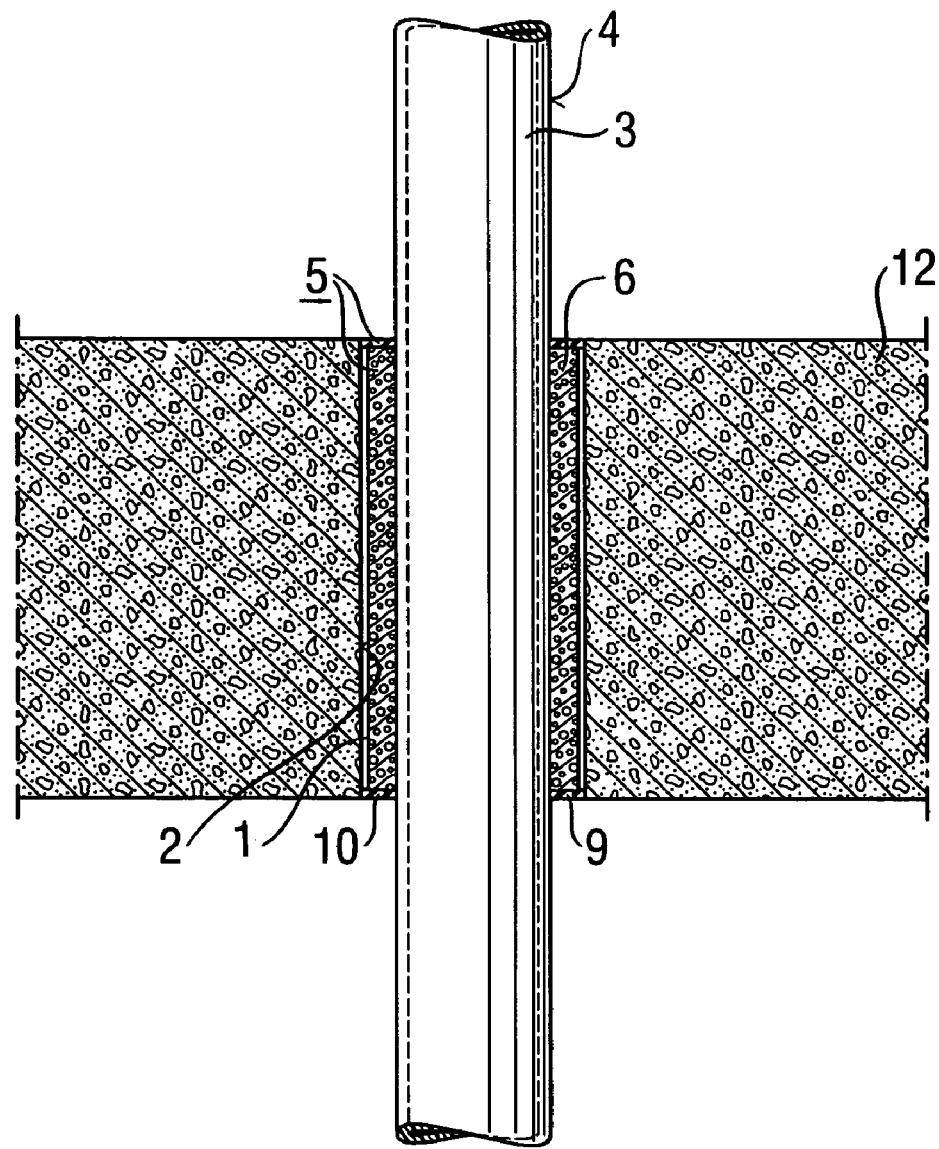
Figure 19:
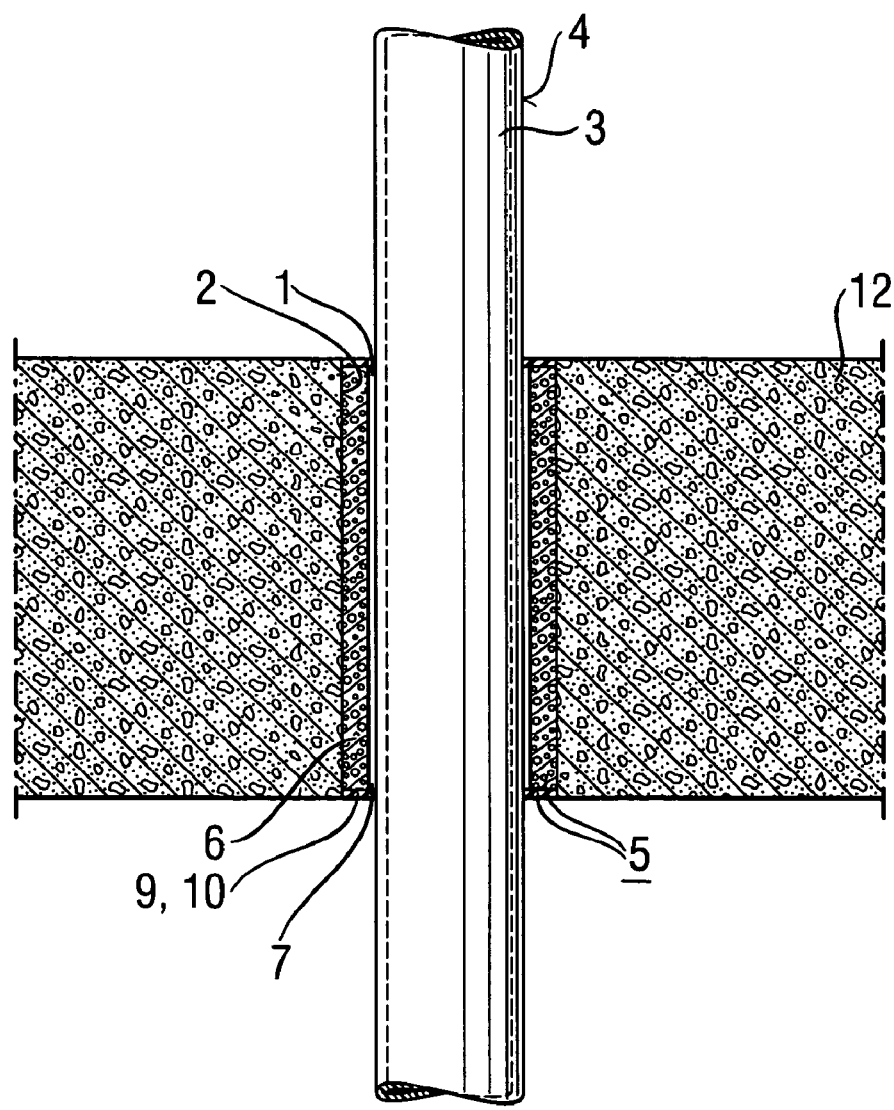
Figure 20:
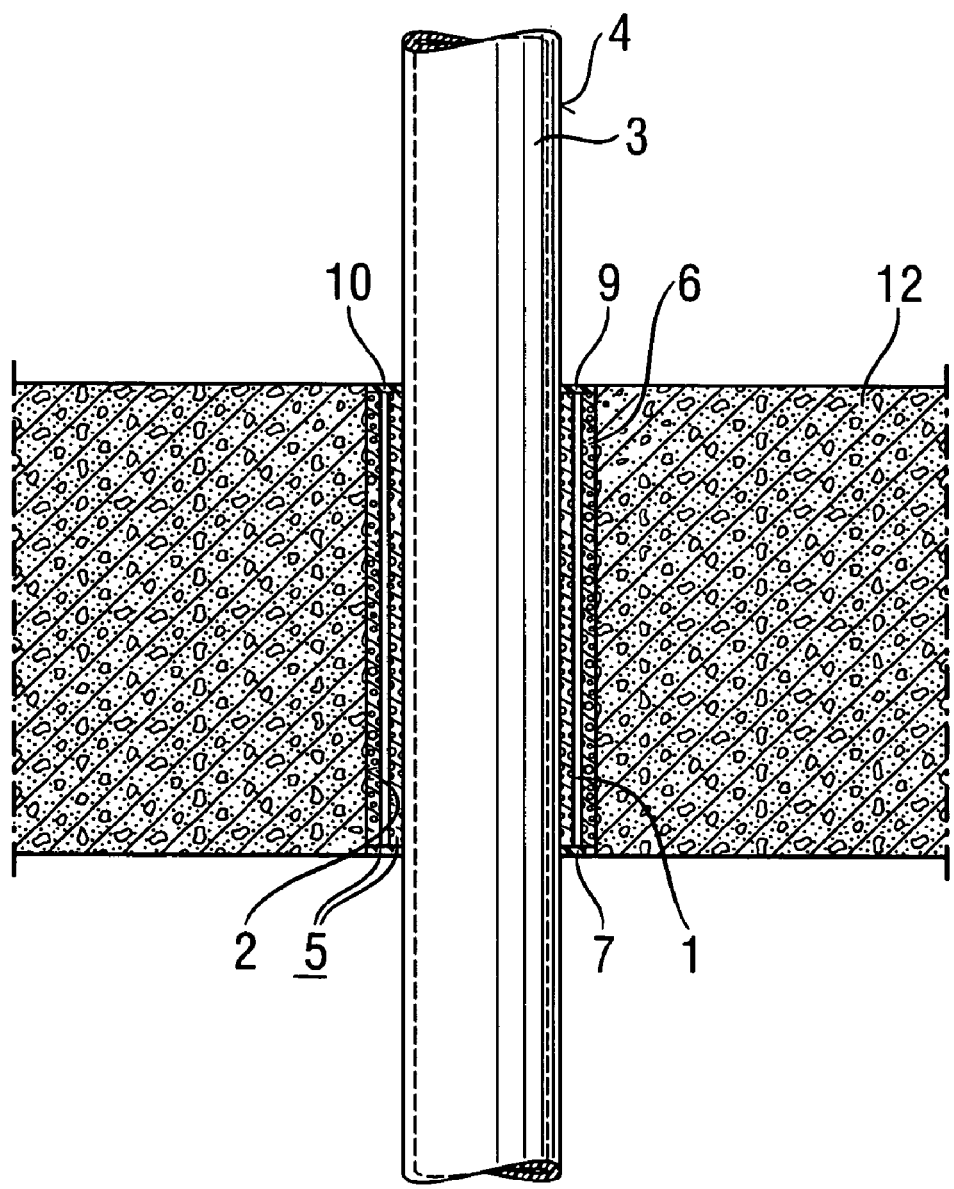
Figure 21:
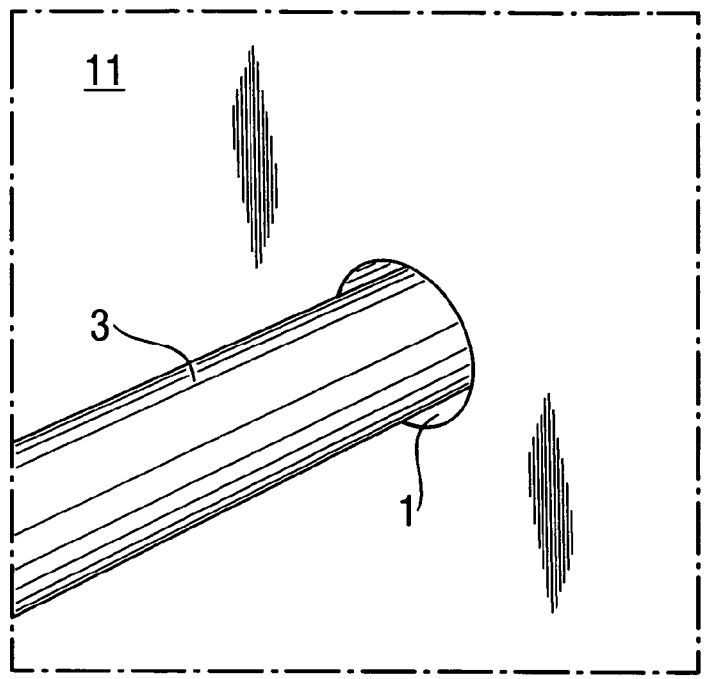
Figure 22:
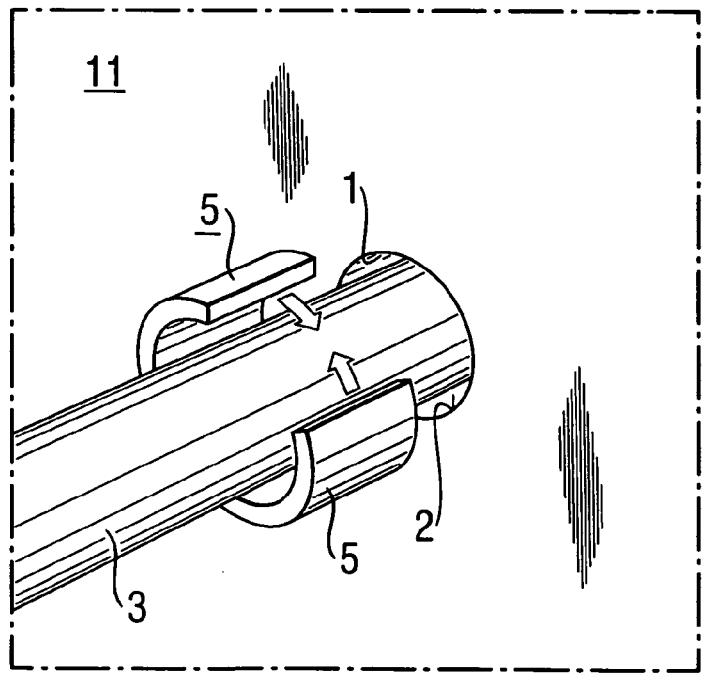
Figure 23:
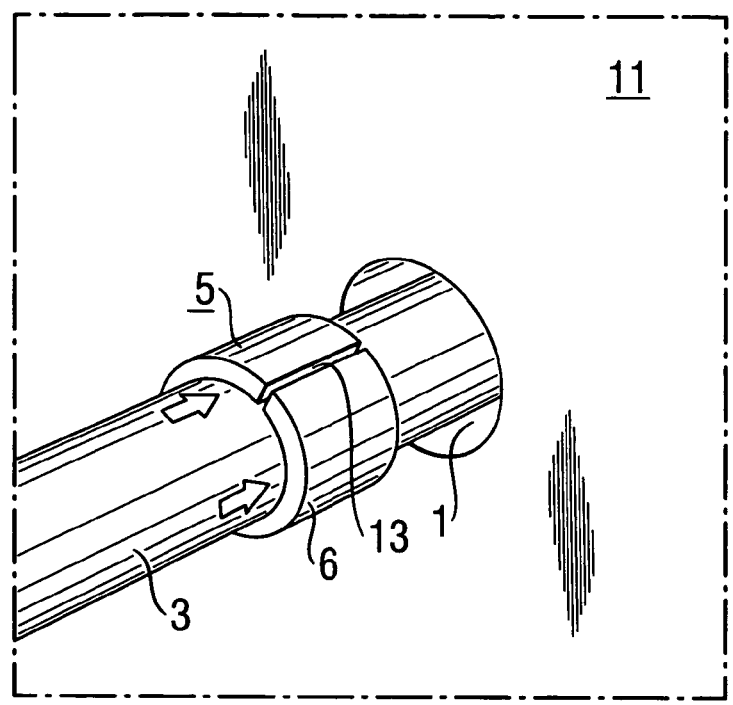
Figure 24:
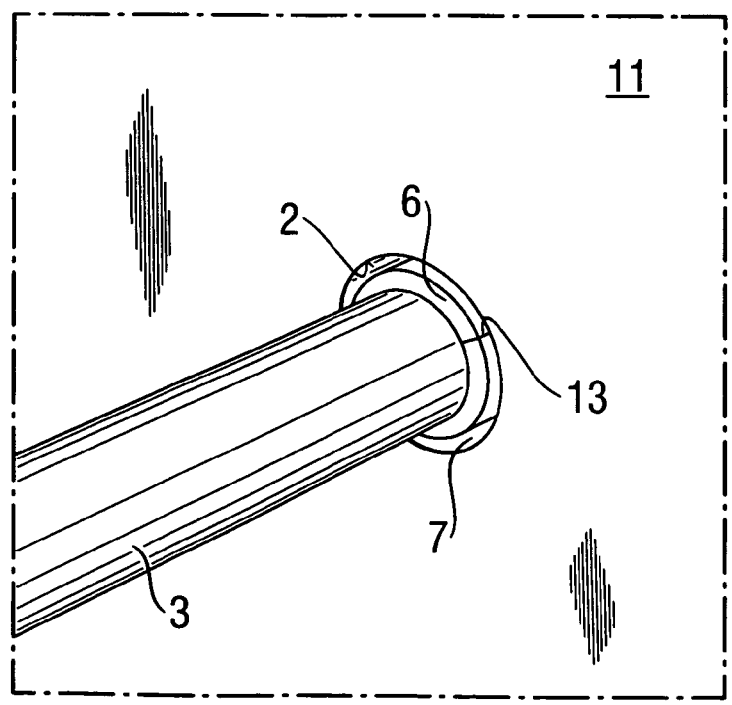
Figure 25:
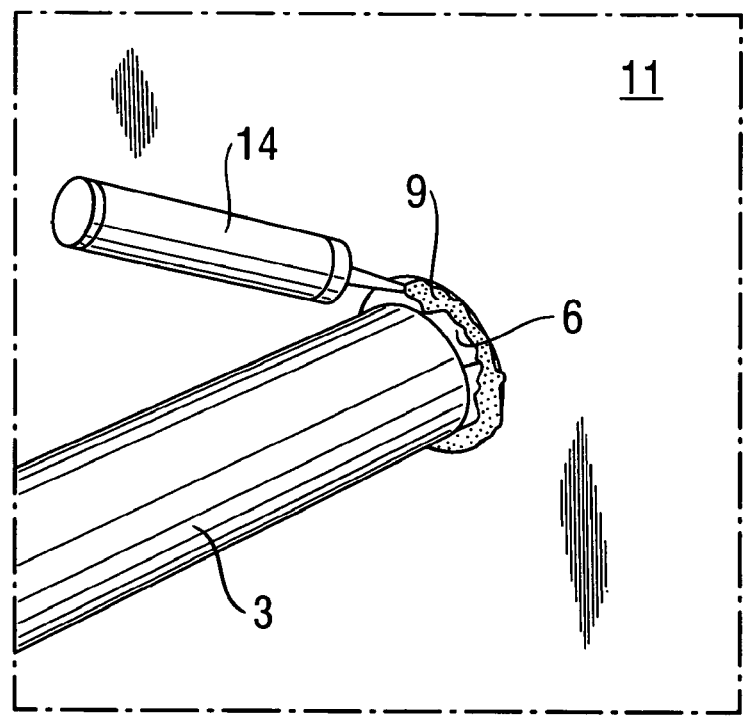
Figure 26:
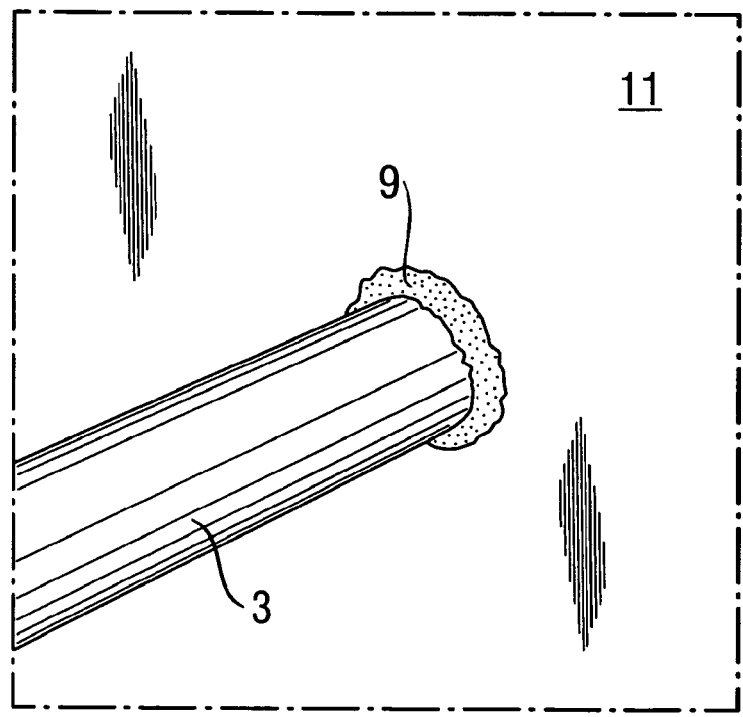
Figure 27:
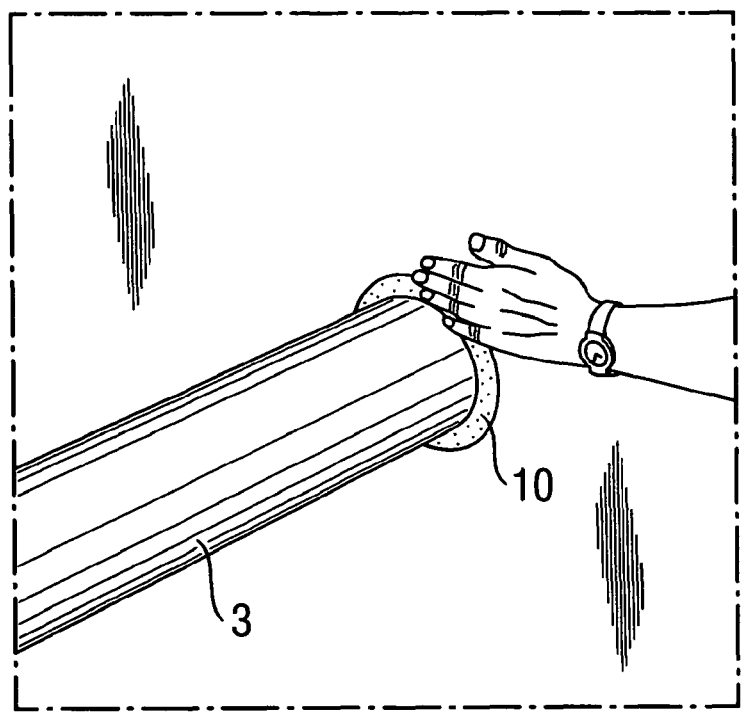
Figure 28:
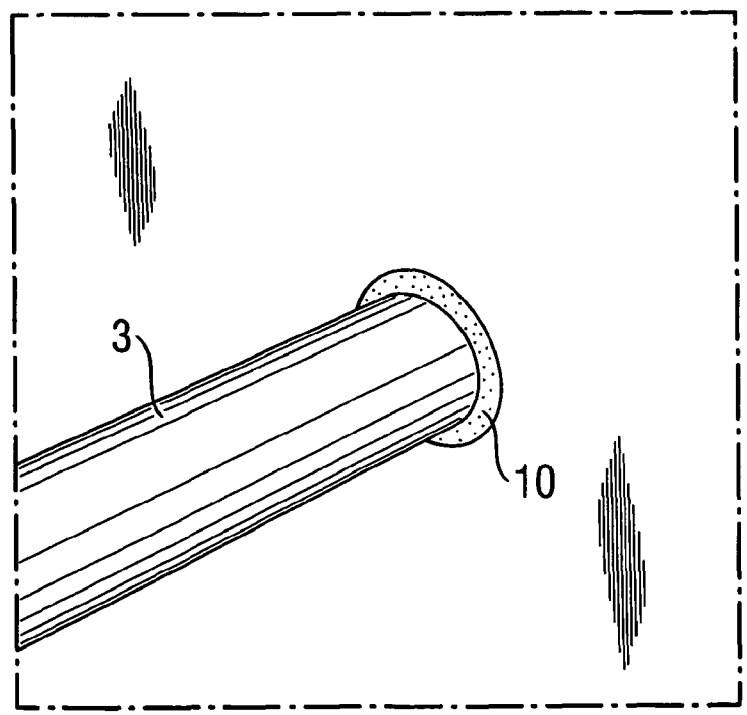
Figure 29:
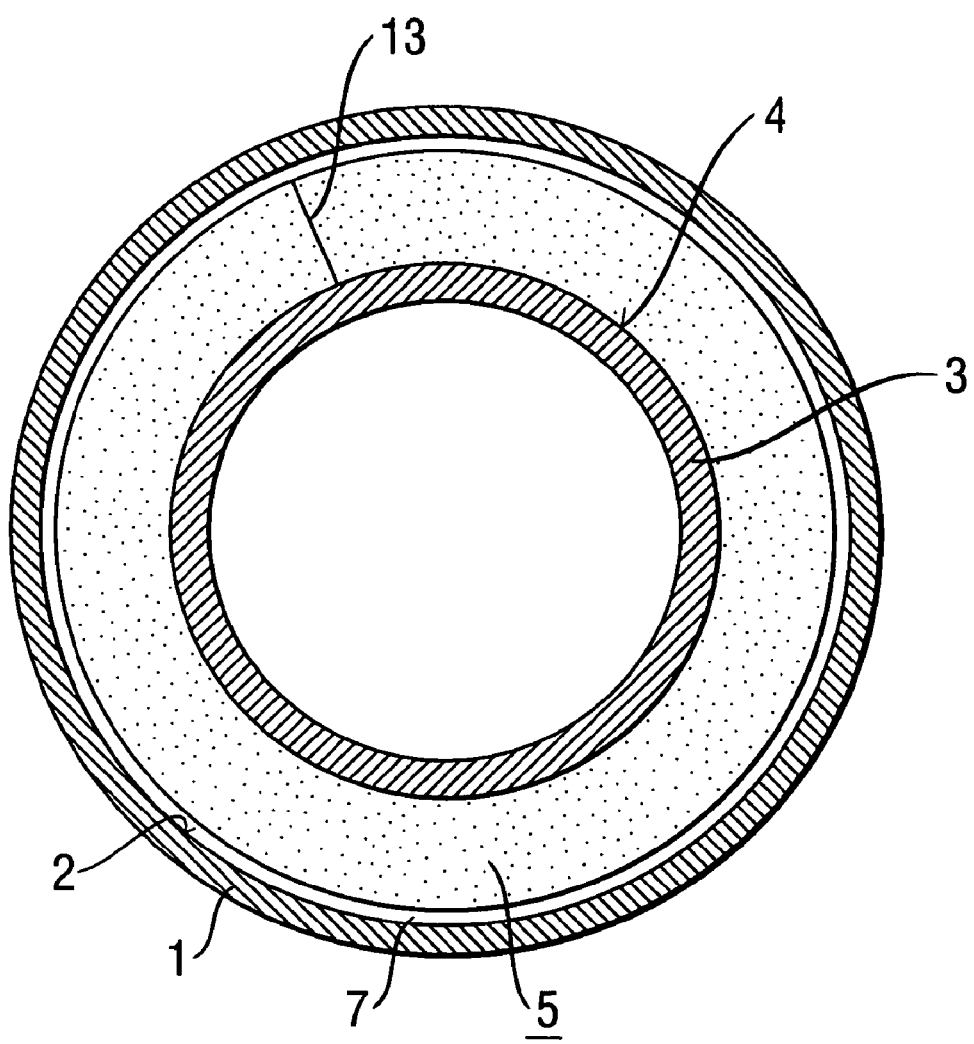
Figure 30:
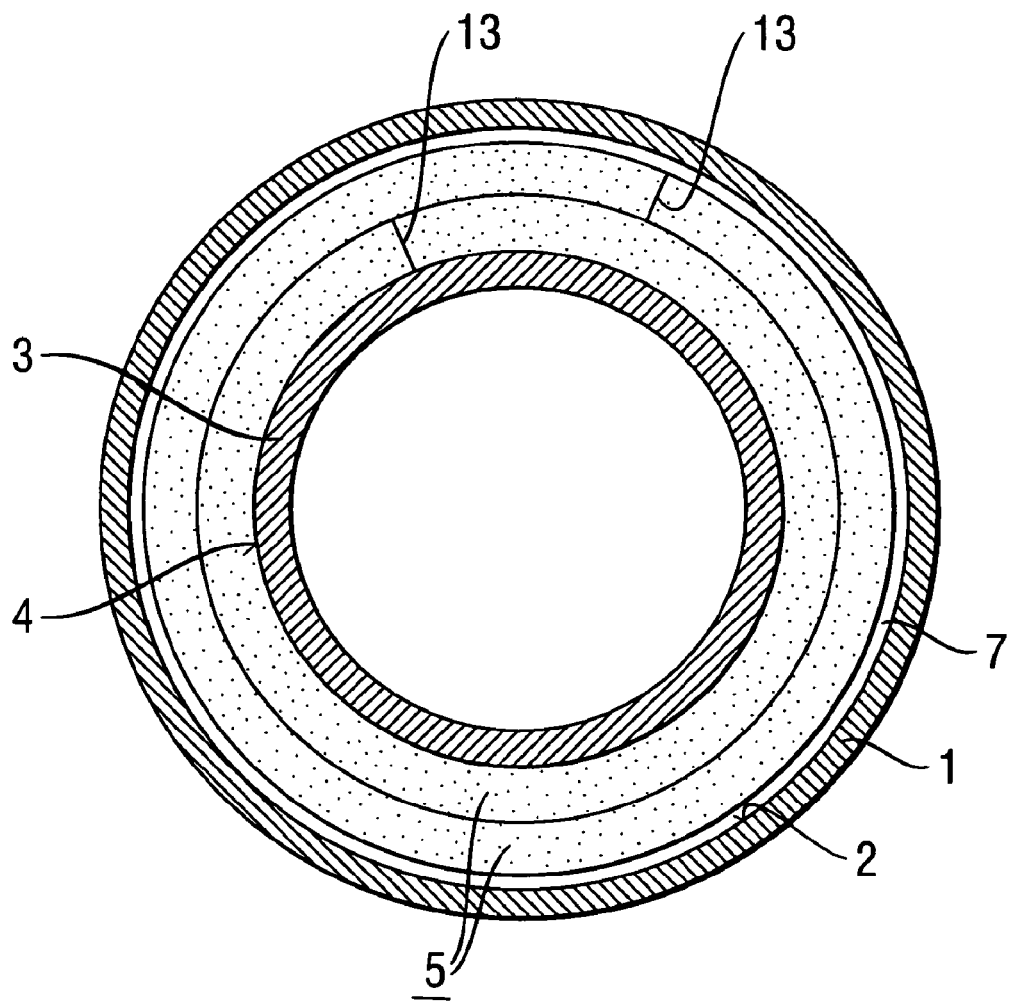
Figure 31:
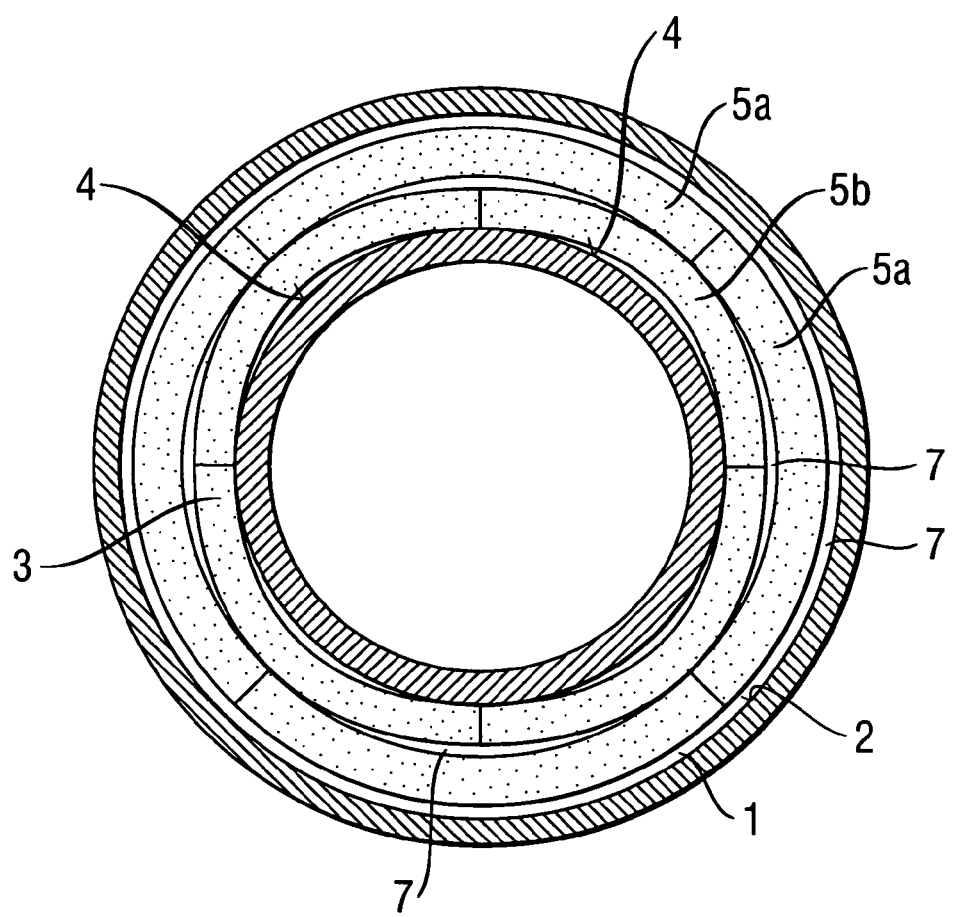
Figure 32:
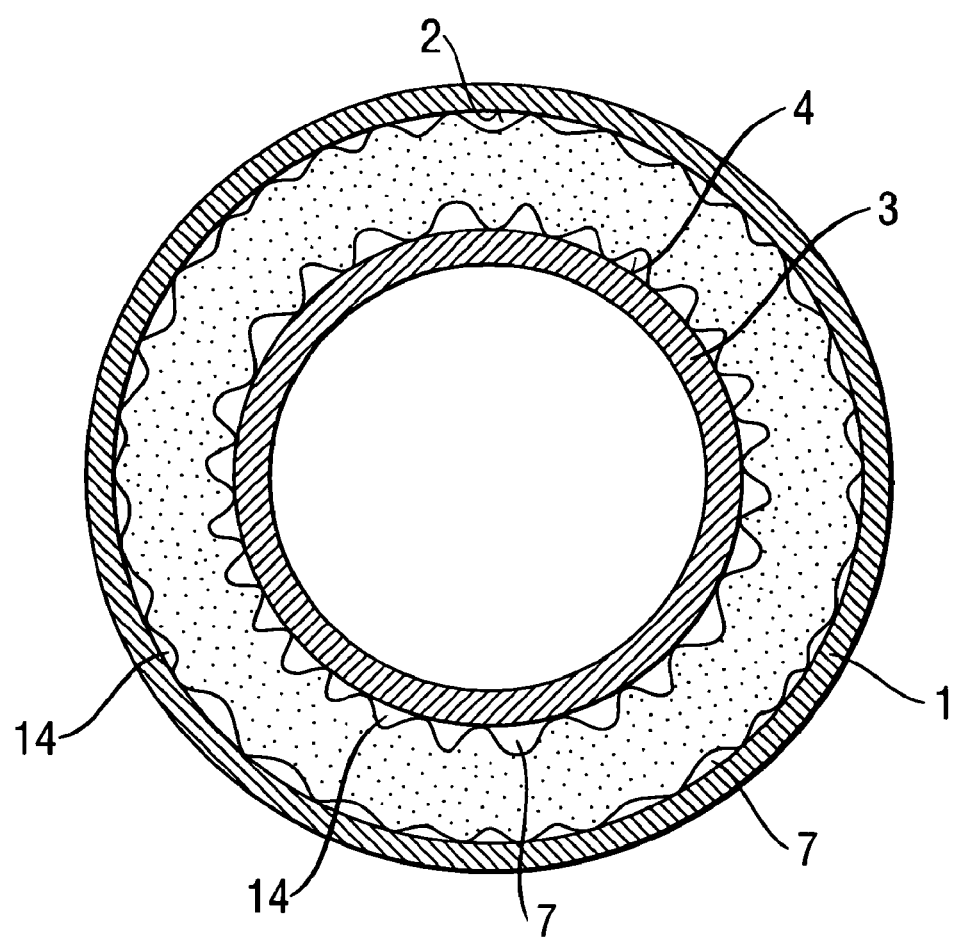
Figure 33:
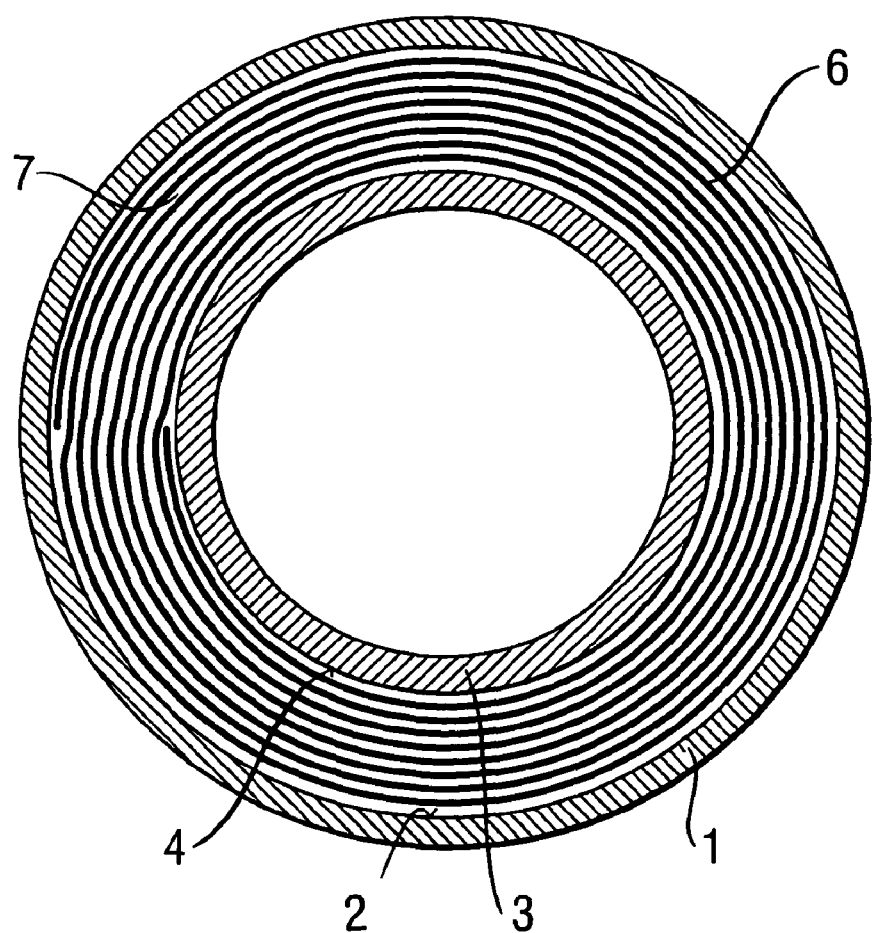
Figure 34:
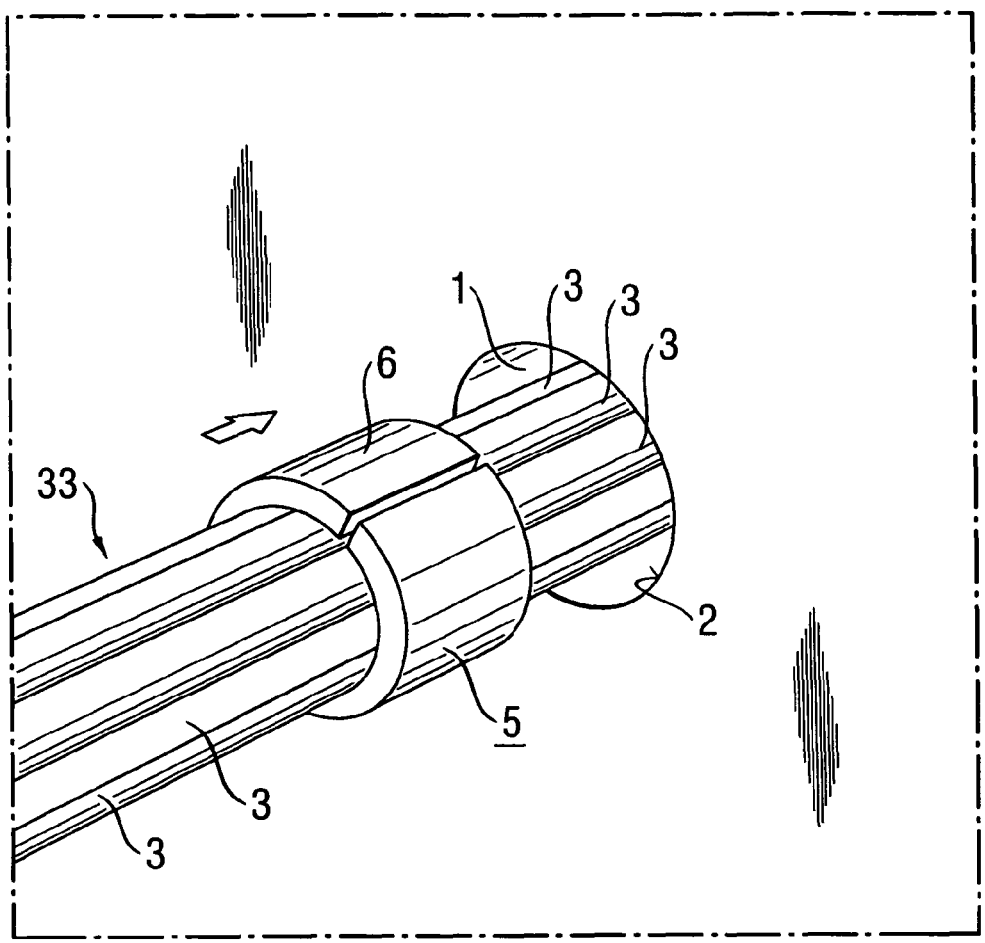
Figure 35:
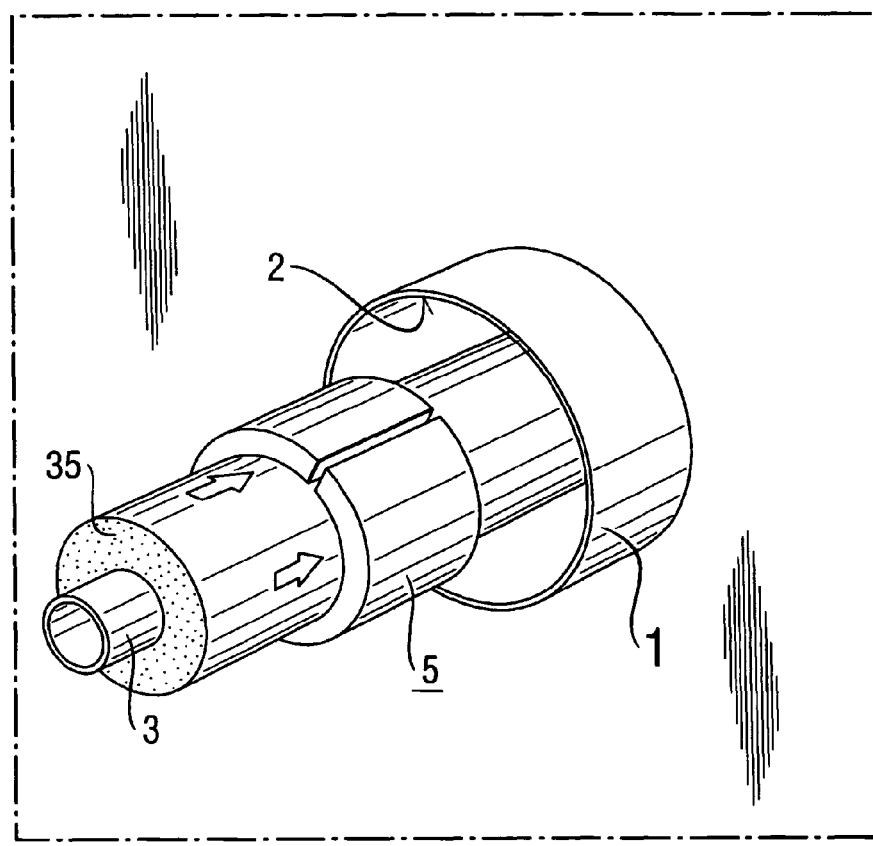

The invention, further embodiments thereof and related advantages, are further described and explained in combination with the exemplary drawings which show in:

FIG. 1 schematically and in cross section along an axial direction a first embodiment of a system and a conduit in accordance with the invention;

FIG. 2 schematically and in cross section along an axial direction a second embodiment of a system and a conduit in accordance with the invention;

FIG. 3 schematically and in cross section along an axial direction a third embodiment of a system and a conduit according to the invention;

FIG. 4 schematically and in cross section along an axial direction a fourth embodiment of a system and a conduit in accordance with the invention;

FIG. 5 schematically and in cross section along an axial direction a fifth embodiment of a system and a conduit in accordance with the invention;

FIG. 6 schematically and in cross section along an axial direction the embodiment shown in FIG. 1 as applied in a deck;

FIG. 7 schematically and in cross section along an axial direction the embodiments shown in FIG. 2 as applied in a deck;

FIG. 8 schematically and in cross section along an axial direction the embodiments shown in FIG. 3 as applied in a deck;

FIG. 9 schematically and in cross section along an axial direction the embodiments shown in FIG. 4 as applied in a deck;

FIG. 10 schematically and in cross section along an axial direction the embodiment as shown in FIG. 5 as applied in a deck;

FIG. 11 schematically and in cross section along an axial direction the system as shown in FIG. 1 as applied in a sixth embodiment of a conduit in accordance with the invention;

FIG. 12 schematically and in cross section along an axial direction a system as shown in FIG. 2 as applied in a conduit as shown in FIG. 11;

FIG. 13 schematically and in cross section along an axial direction the system as shown in FIG. 3 as applied in a conduit as shown in FIG. 11;

FIG. 14 schematically and in cross section along an axial direction the system as shown in FIG. 4 as applied in a conduit as shown in FIG. 11;

FIG. 15 schematically and in cross section along an axial direction the system as shown in FIG. 5 as applied in a conduit as shown in FIG. 11;

FIG. 16 schematically and in cross section along an axial direction the system and conduit as shown in FIG. 11 as applied in a ceiling or floor;

FIG. 17 schematically and in cross section along an axial direction the system and conduit as shown in FIG. 12 as applied in a ceiling or floor;

FIG. 18 schematically and in cross section along an axial direction the system and conduit as shown in FIG. 13 as applied in a ceiling or floor;

FIG. 19 schematically and in cross section along an axial direction the system and conduit as shown in FIG. 14 as applied in a ceiling or floor;

FIG. 20 schematically and in cross section along an axial direction the system and conduit as shown in FIG. 15 as applied in a ceiling or floor;

FIG. 21 a rigid and thermally stable conduit having an inner wall defining inner space through which a single pipe extends;

FIG. 22 a step of an embodiment of a method according to the invention;

FIG. 23 a step of an embodiment of a method according to the invention;

FIG. 24 result of steps of an embodiment of a method according to the invention;

FIG. 25 a step of an embodiment of a method according to the invention;

FIG. 26 result of steps of an embodiment of a method according to the invention;

FIG. 27 a step of an embodiment of a method according to the invention;

FIG. 28 end result of steps of an embodiment of a method according to the invention;

FIG. 29 schematically and in transverse cross section an embodiment of a system and a conduit in accordance with the invention;

FIG. 30 schematically and in transverse cross section an embodiment of a system and a conduit in accordance with the invention;

FIG. 31 schematically and in transverse cross section an embodiment of a system and a conduit in accordance with the invention;

FIG. 32 schematically and in transverse cross section an embodiment of a system and a conduit in accordance with the invention;

FIG. 33 schematically and in transverse cross section an embodiment of a system and a conduit in accordance with the invention;

FIG. 34 a perspective view of an alternative application of an embodiment of a system and of a conduit in accordance with the invention;

FIG. 35 a perspective view of an alternative application of an embodiment of a system and of a conduit in accordance with the invention.

In the drawing like parts have like references.

FIG. 1 shows a conduit 1 which is thermally stable, in this example made of metal. The conduit 1 has an inner wall 2 which defines an inner space through which a single pipe 3 extends. The pipe 3 is a thermally weakenable pipe and has an outer wall 4. This could for instance be a pipe made of PVC or of polyethylene. However, it is also envisagable that a thermally weakenable pipe comprises fiber glass as reinforcement. Such a pipe may comprise a resin surrounding the fiber glass.

A thermally expandable fire-stop system 5 is placed in the conduit 1. In this example, the system 5 includes a device 6 which includes at least one component having a non-linear thermal expansion characteristic. As shown, the device 6 is concentrically positionable around pipe 3, such that, after completed placement of the system 5 and before onset of the non-linear thermal expansion of the device, hot gas can from outside the conduit enter a gas-entrance space 7 between the device 6 and an inner wall 2 of the conduit 1.

The device 6 has surfaces which start melting at a temperature under a lowest end of a temperature range in which the device displays its non-linear expansion characteristic.

It will be understood that when hot gas, as present due to a nearby fire, will enter the gas-entrance space 7, the first response of the device 6 will be the melting of its surfaces which are being heated up by interaction with this hot gas. As a result of this, a sticky material will be formed at the surface of the device 6. Adherence of the device 6 to the inner wall 2 of the conduit 1 will take place. As the device may also already expand a little, even though as yet probably not within the non-linear expansion regime, the device 6 may firmly fix itself within the conduit 1. Heat will also via pipe 3 be transferred into the conduit 1. Before the pipe reaches a temperature at which it starts weakening, it will reach a temperature at which the surfaces of the device start melting. Consequently, the device 6 will also adhere itself to the outer layer 4 of the pipe 3. The device 6 has then firmly fixed itself within the conduit 1 to the inner wall 2 thereof, and to pipe 3, to the outer wall 4 thereof.

On a further exposure to heat, due to a nearby fire, the temperature in the conduit 1 will further rise. The thermally weakenable pipe 3, made of for instance a plastic, becomes soft when exposed to a temperature of about 75° C. or higher. At some stage the device 6 will reach a temperature at which the non-linear thermal expansion starts taking place. As the device 6 has fixed itself against the inner wall 2 of the conduit 1 and the outer wall 4 of the pipe 3, axial expansion is restricted. However, radial expansion inwards is relatively easy, in particular due to the weakened pipe 3. Effectively, the device 6 "crushes" the weakened pipe 3 and closes as such the conduit 1 completely off.

It has turned out that the radially inward expansion can be forceful and up to an extent that the device as expanded as a result of the non-linear expansion not only crushes the pipe and closes off the conduit 1 but also clamps itself "unremovably" tight within the conduit 1. The closure of the conduit is then watertight. Removal of the expanded device from the closed conduit requires dedicated tools. This is very advantageous for situations wherein a fire occurs within an isolated compartment. For instance, when a fire occurs in an engine room of a vessel; and the conduits are closed off as described; and the engine room is filled with water to extinguish the fire, it is not necessarily the case that the water will from the engine room penetrate via the conduits through the entire vessel.

As shown in FIG. 1, it is likely that at one side of the conduit 1 insulation material 8 is applied. If the conduit 1 is applied in a wall 11, this material will normally be applied at the side of the conduit 1 which is not expected to be directly exposed to fire or heat. This side is in the drawing indicated with UES, which stands for UnExposed Side.

The side directly exposed to heat resulting from a nearby fire is referred to with ES, standing for Exposed Side. The insulation material 8 as applied in a situation where the conduit 1 is made of a metal or a metal alloy, is normally based on mineral wool.

In particular, in a situation where the exposure to heat takes place at only one side of the conduit 1, the actual response of the system 5 will, relative to the conduit 1, also be asymmetric. The responding part of the system 5 will also provide insulation, in particular once the pipe 3 has fully been closed by the expanding device 6. It has been observed that a temperature rise at a side of the conduit where no fire takes place (the UES) will not become much higher than 60-70° C. during exposure of the other side (ES) of the conduit 1 to a nearby fire. This applies in particular when insulation material 8 has been applied at the non-exposed side of the conduit 1.

It has also turned out that, probably as a result of the insulation provided by the early fixing of a part of the device 6 within the conduit 1, a transition between the fully expanded part of the device 6 and the non-expanded or marginally expanded part of the device 6, is abrupt. Clearly, the heat remains localised, available and used for the full expansion of the device at the ES.

As will later be discussed in much more detail, the device has preferably the shape of a sleeve. However, also other configurations of the device 6 are possible. The device is preferably made of a vulcanizable rubber-like compound, which has been extruded into a predetermined shape. One of the components could for instance be ethylvinylacetate polymer (EVA), which starts melting at around 60° C. The compound having a non-linear thermal expansion characteristic may comprise heat expandable graphite as well known in the art, and commercially available in various grades. For more information on a device 6, reference is made to for instance WO 03/013658.

It is possible that the compound comprises a first type of an expanding agent and a second type of an expanding agent, such as for instance a first type of heat expandable graphite and a second type of heat expandable graphite. The first type may for instance start expanding at a temperature that is lower than a temperature at which the second type starts expanding. For a person skilled in the art, it would be within routine experimental engineering work to find materials such that the device will have surfaces which start melting upon exposure to hot gas, and as a result fix itself to other surfaces. The one or more expanding agents also known in the art) will ensure that upon exposure of the device 6 to higher temperatures, the device 6 will then start expanding in a non-linear fashion and in a direction normal to those surfaces.

A conduit as shown in FIG. 1 is typically found on board of vessels and/or offshore constructions. The conduit 1 may be placed, welded in, in a metal wall 11 or partition wall 11 between compartments. However, it may also be placed within an outer wall 11 of such a construction.

We will now discuss a number of other embodiments of system 5, as applicable in a conduit 1 as shown in FIG. 1.

FIG. 2 shows an embodiment of a system 5 wherein the system further comprises a sealant 9 for sealing one end of the conduit 1 by means of applying a layer 10 of the sealant. In the embodiment shown in FIG. 2 the sealing layer 10 preferably has a thickness of more than 15 mm. Such a sealant 9 is commercially available from the applicant under the trade mark name FIWA. A sealant may be vulcanizable at room temperature and upon exposure to humidity. Such sealants are commercially available. The sealant 9 may further be of a thermally substantially shape-retaining and size-retaining type and such that after vulcanization the sealant has a hardness within the range of 45-60° C. Shore A. Such a sealant 9 can be based on silicon, and is commercially available, for instance as a putty which is sold under the trade name NOFIRNO. The sealant 9 may be applied as a layer having a thickness of 15 mm up to 20 mm and should according to this invention only be applied at the side (UES) of the conduit 1 which is unlikely to be directly exposed to a nearby fire. In FIG. 2, the UES is the side to which the insulation material 8 has been applied.

The response of system 5 as shown in FIG. 2 is similar to the response of system 5 as shown in FIG. 1. The main difference is that in the embodiment shown in FIG. 2 hot gas or smoke cannot travel from the exposed side to the unexposed side, as the sealant layer 10 blocks the UES-end of the conduit 1 off for transport of such gases. If, due to exposure of hot gas, only a part of device 5, namely the part situated at the exposed side, responds as described above, it is possible that a part of gas-entrance space 7 as situated more to the unexposed side will form a cavity. This is then due to the firm fixation of the part of device 5 to the inner wall 2 and the outer wall 4, at the exposed side. Such an air cavity at the UES-end will then form perfect insulation. The temperature of the pipe at the unexposed side will then, if the exposed side is indeed exposed to a nearby fire, remain low for much longer as compared to the situation shown by FIG. 1.

FIG. 3 shows another embodiment of a system 5. In this conduit 1 each end of the conduit 1 is provided with a sealing which comprises a sealant having a thickness of about 5 mm or less, so that upon exposure to a nearby fire hot gas can still enter from outside the conduit 1 the gas-entrance space 7 before onset of the non-linear expansion of the device 5. It is possible to apply the sealant on only one end of the conduit 1. A sealant layer having a thickness of about 5 mm or less will either be consumed due to a nearby fire, break or tear, or otherwise give way to hot gas, which will then enter the gas-entrance space 7. The response of system 5 as shown in FIG. 3 is essentially the same as the response of system 5 as shown in FIG. 1. The difference is that for system 5 as shown in FIG. 3 it will take some time before outer surfaces of the device 6 will be heated up by hot gas entering gas-entrance space 7. For a period of time the thin sealant layer 10 will block entrance of gas into conduit 1. however, once sealant layer 10 gives way, most likely only at the exposed side, hot gas will enter entrance space 7 and the response of the system as described above will follow.

FIG. 4 shows an embodiment of a system similar to the system 5 as shown in FIG. 3. however, the system 5 is such, or has been applied such, that the gas-entrance space 7 is between the outer wall 4 of the pipe 3 and the device 6, instead of between the device 6 and an inner wall 2 of the conduit 1. In particular, where the conduit 1 is placed in a wall 11 which has a relatively high heat conductivity, such as a wall of steel or brass, and the conduit 1 itself is made of a thermally conducting material, such as a metal, metal alloy etc., the surface of the device 6 facing, and perhaps even in contact with the inner wall 2 of conduit 1 will be heated up by the conduit 1 and fixed to the conduit 1. After "collapsing" of sealant layer 10 at the exposed side, hot gas will be able to enter gas-entrance space 7 and heat up a surface of device 6 facing the outer wall 4 of the tube 3. Fixation of that surface to the outer wall 4 of pipe 3 will then take place and the device will then as such be fully fixed within conduit 1. Upon exposure to more heat, again the radial expansion will dominate relative to the inhibited axial expansion.

FIG. 5 shows an embodiment of a system 6 wherein the gas-entrance 7 is through the device 6 once hot gas enters the gas-entrance space 7 after "collapse" of sealant layer 10 at the exposed side. Surfaces of device 6 facing other surfaces of device 6 will melt and adhere to each other. A surface of device 6 that is facing inner wall 2 of conduit 1 will be heated up and be fixed to that inner wall 2 as described above when explaining how the system shown in FIG. 4 works. A surface of device 6 facing outer wall 4 of pipe 3 will be heated by heat transported into the conduit via pipe 3. Eventually, also this device 6 will fix itself to inner wall 2 of conduit 1 and outer wall 4 of pipe 3, as such inhibiting axial expansion and favoring radial inward expansion, upon further exposure to heat and rise in temperature.

The different embodiments will have different responses upon exposure to similar temperature profiles. However, eventually, the final results are substantially the same.

It must be borne in mind that it is possible to combine a single relatively thick sealant layer 10 applied at the UES-end of the conduit 1 (as shown in FIG. 2) with any of the embodiments of the device 6 as shown in FIGS. 3, 4 and 5. Likewise, the embodiments of the device 6 as shown in FIGS. 3, 4 and 5 can also be applied without any sealant layer 10, in a way similar to the embodiment shown in FIG. 1.

FIGS. 6-10 show embodiments corresponding respectively to FIGS. 1-5. However, in the FIGS. 6-10 the conduit is applied in a deck or ceiling 12. The ceiling side has been indicated by a C and the flooring side has been indicated by an F. The axial direction of the pipe 3 and conduit 1 is in a vertical direction. As can be seen in each of these FIGS. 6-10, the insulation material 8 is applied against the ceiling 12, as is normally the case. The systems 5 are further applied such that hot gas will be entering from the ceiling side C rather than from the flooring side F. As visible in FIG. 7, where a thick single sealing layer 10 is applied, this is applied at the floor side F. Clearly, the embodiment shown in FIGS. 6-10 anticipate the hot gas to enter the gas-entrance space 7 from the ceiling side C. The device 6 can be made such that the material clamps itself stably within the conduit, either against the inner wall 2 of the conduit 1 and/or against the outer wall 4 of the pipe 3. However, it is also possible that the device 6 is by other means kept within the conduit 1. Such means could be sticking materials such as for instance double-sided tape. The embodiments shown in FIGS. 8-10 show how the device 6 can be kept within the conduit by application of a sealing layer 10 at the ceiling side C.

Although it is shown that the conduit 1 can be symmetrically positioned relative to the floor/ceiling 12, it is possible that the conduit is extending fully into the ceiling side or extending fully into the flooring side. All configurations between these two extremes are equally possible. The configuration shown in FIGS. 1-10 are typically seen onboard of vessels and/or offshore constructions.

FIGS. 11-20 show essentially the same systems 5 as respectively shown in FIGS. 1-10. The main difference is that the conduit is placed in a wall 11 which has a relatively low heat conductivity, such as a wall of stone or concrete (FIGS. 11-15), or in a floor or ceiling of that material (FIG. 16-20). Usually, conduit 1 has in those situations an inner wall 2 substantially made of a relatively low heat conductivity material, such as of stone or concrete. In those situations is the conduit nothing more than an opening, a hole, in the stone or concrete wall. It will have to be borne in mind that the main route for transport of heat into the conduit 1 will in these cases be the pipe and the hot gas entering gas-entrance space 7 and pipe 3. However, it is not impossible that a conduit 1 still has an inner wall substantially made of a relatively high conductivity material such as steel or brass, as for instance "cast-in" in the concrete.

The diameter of the conduit 1 is relatively small to the diameter of the pipe 3. Preferably, the outer diameter of the pipe 3 is more than 50% of the inner diameter of the conduit 1. Even more preferable is that the outer diameter of the pipe is more than 60% of the inner diameter of the conduit 1. A further optimization is achieved when the outer diameter of the pipe 3 is more than 70% of the inner diameter of the conduit 1. Of course, the larger the outer diameter of the pipe 3 relative to the inner diameter of the conduit 1, the more space is saved. The partition shown in FIGS. 1-10 may be of a metal alloy, typically steel aluminium or a copper alloy. However, as shown in FIGS. 11-20, the partition itself may comprise a stone or concrete wall, floor or ceiling. In that case the conduit 1 is likely to comprise a through hole in that stone or concrete wall. When the partition is a stone or concrete wall, normally no insulation material is applied on any side of the partition 1.

When the conduit 1 is of a metal alloy, the conduit 1 can have a length of about 18 cm. When the conduit is based on a through hole in a partition of stone or concrete, the conduit 1 may have a length as short as about 15 cm. The system for sealing is essentially the same for each type of conduit, metal or stone/concrete.

The layer of a thermally expandable device 6 may be a single part device. The thermally expandable device 6 includes at least one component having a non-linear thermal expansion characteristic, which may be in the form of heat expandable graphites. The device is preferably of a non-intumescent material.

The sealant 9 may be made of a fire-resistant polymer and of a thermally substantially shape-retaining and size-retaining type preferably comprises polymer which is free from components which would on heating cause the polymer to expand to an extent larger than the extent to which the polymer itself expands on such heating. Preferably, the polymer comprises a silicon based polymer. Ideally, the sealant is non-ignitable at a temperature of 400° C. It is further advantageous for the application when the sealant has an oxygen index of 45% or higher as determined by the well-known internationally recognized way of measuring the oxygen index.

Turning now to FIGS. 21-28, an exemplary embodiment of a method for providing a fire stop system in a rigid conduit 1 is disclosed. Depicted is a conduit 1 in a partition 11 of stone or concrete, but if the partition 11 and conduit 1 were made of a metal of metal alloy, the method would essentially be the same. The conduit could equally be applied in a ceiling or floor.

FIG. 21 shows a partition 11 having a conduit 1 with extending therethrough a pipe 3 made of a thermally weakenable material. As shown in FIG. 22, a step of the method comprises applying a device 5 including at least one component having a non-linear thermal expansion characteristic (not shown). The device 5 is more or less concentrically applied around the pipe 3. The device 5 may be provided in the form of a sleeve as shown in FIG. 22 as having a slit 13 for conveniently manipulating the sleeve around the pipe 3. As schematically shown in FIG. 23 once the sleeve has been manipulated around the pipe 3 it is pushed into the conduit 1. Preferably, this sleeve ends up in the middle of the conduit, still at each end of the conduit allowing for space which can be occupied by the sealant 9, so that the sealant 9 will be in the conduit 1 and flush with the partition 11. FIG. 24 shows the end result of applying the device 6 concentrically around the pipe 3. The device 6 has been positioned such that before onset of the non-linear thermal expansion of the device, hot gas can enter a gas-entrance space between the device 6 and the inner wall 2 of the conduit 1.

As shown in FIG. 25, the sealant 9 may in a next step be applied at one (or each) end of the conduit 1 between the conduit 1 and the pipe 3. As discussed before, this sealant 9 may be made of a fire-resistant polymer and is vulcanizable at room temperature under exposure to humidity. The sealant 9 may further be of a thermally substantially shape-retaining and size-retaining type and such that after vulcanization the sealant has a hardness within a range of 45-60 Shore A. Application of the sealant can, for instance, take place with the aid of a sealant dispenser 14. The sealant 9 may be applied in a very generous way relative to the volume in the conduit 1 that can be filled with the sealant 9 (as shown in FIG. 25). The excess of sealant 9 can easily be removed during installation work. The remaining sealant 9 can be pressed flat (FIG. 27). It is recommendable that the hands are made wet with for instance water so that the sealant does not stick to the hand of the worker. Finally, sealant 9 will be flush with, in this case, the partition 11. The partition 11 with the conduit 1 having installed in it the system 6 as disclosed in this specification, will be as shown in FIG. 28. In case the conduit 1 is made of steel or a metal (alloy), the sealant will be flush with each end-rim of the conduit 1.

As indicated above, the sealant layer 10 may be applied at only one end of the conduit. In such a case it should be the end which is opposite the end tat is expected to be directly exposed to a nearby fire. The sealant layer may in that situation be applied such that it will have a thickness of more than 25 mm, ideally about 20 mm. It is also possible to apply a sealant layer 10 at each end of the conduit 1. In that case, the thickness of the layer should be about 5 mm or less and so that upon exposure to a nearby fire, hot gas can still enter from outside the conduit 1 the gas-entrance space 7 before the onset of the non-linear expansion device 6.

As indicated above, the system 5 as described for use in a conduit 1 which is a through hole in a concrete or stone wall 11 and the system 5 for use in a conduit 1 which is made of metal or a metal alloy as part of a partition 11 which is also made of a metal or metal alloy, are essentially the same. Importantly, the routes available for transfer of heat into the conduit 1 and in particular to the surfaces of device 6 differs between these two types of conduit 1. The conduit 1 which is part of a metal or metal alloy partition 11 and which is made of metal or a metal alloy itself allows for transfer of heat into the conduit 1 via the material of the partition and the material of the conduit as well as via the pipe 3 extending from the heat exposed side ES into the conduit 1. In other words, in this case two routes are available. On the other hand, the conduit 1 which comprises a through hole in a stone or concrete partition 11 has only one route for transfer of heat into the conduit available which is the route offered by the pipe itself. A concrete or stone partition 11, will first absorb heat which will take a long time, before it will start transferring that heat into the conduit 1. By the time transfer of heat from the concrete or stone wall itself into the conduit takes place, the pipe, tube or duct of thermally weakenable material will already have weakened to a large extent.

Interestingly, it has turned out that the sealing system 5 as described above is applicable for each of these types of conduit 1. Of course, when the conduit 1 is made of a metal or metal alloy and part of a metal or metal alloy partition, heat will very rapidly enter the conduit and the thermally expandable device 6 will respond rapidly. However, disadvantageously, the use of a steel or metal conduit 1 is always vulnerable to corrosion.

It has turned out that the sealing system as described above does also respond fast enough when the conduit is a through hole in a concrete or stone wall.

A further advantage of the system according to the invention is, as following from above, that one system is provided for different types of conduit 1. These conduits 1 may as outlined differ in the sense that the available routes for heat transfer into the conduit are different.

It has been indicated above that the actual length of the conduit 1 may differ for the different types of conduit 1. In general, the length of a conduit 1 which comprises a through hole in a stone or concrete wall can be as short as about 15 cm. The length of a conduit 1 as used in a steel construction as for instance in the offshore and shipbuilding industry, can be as short as about 18 cm. Given the availability of differently sized pipes, i.e. different in the sense of their outer diameter, and the availability of differently sized conduits, in this case different inner diameters, the device 5 can be provided as a single layered sleeve, having a slit 13 substantially extending in an axial direction, and dimensions according to one of the possibilities as described below. Clearly, the length of the device cannot be too short. After all, there has to be enough thermally expandable material to "crush" the pipe, and to close off the conduit. Expansion upon exposure to heat may be in a range between 5 to 40 times its original volume.

The device 6 may, if in the shape of a sleeve have a length of about 170 mm long and have as thickness of the sleeve material about 2 mm for pipes having a diameter of 25 mm; a thickness of about 4 mm for pipes of 25-50 mm; a thickness of about 6 mm for pipes of 51-74 mm; a thickness of about 8 mm for pipes of 75-109 mm; a thickness of about 14 mm for pipes of 110-124 mm; a thickness of about 18 mm for pipes of 125-139 mm.

For pipes with a diameter in a range of 140-160 mm, the sleeve material has preferably a thickness of about 20 mm. The length of the sleeve is then preferably 190 mm.

The gas-entrance space 7 has in transverse direction preferably a "gap size" of no more than 3 mm for pipes up to 2"; no more than 6 mm for pipes up to 2" to 4"; and no more than 10 mm for pipes up to 6" outer diameter.

Reference is now made to FIGS. 29-33 for a discussion of various embodiments of a device 6 as part of a system 5. it has already been indicated that device 6 may have the shape of a sleeve.

FIG. 29 shows schematically a transverse cross section of a conduit 1 and a pipe 3 between which a device 6 is positioned. The device 6 may be a multi-part device such as for instance shown in FIGS. 30 and 31. The sleeves shown in FIGS. 30 and 31 "clamp" themselves around the pipe 3. However, it is also possible that the sleeves "clamp" themselves against the inner wall 2 of the conduit, so that the gas-entrance space 7 is between the device 6 and the pipe 3. The device as shown in FIG. 31 comprises parts 5a, 5b which are radially spaced apart. The device as shown in FIG. 32 is provided with a number of channels 14 which form in use a gas-entrance space 7. FIG. 33 shows a device 6 which is a wrappable device, comprising one or more sheets of a rubber-like material comprising the component having a non-linear thermal expansion characteristic.

It is also possible that even though the device 6 is positionable concentrically from a geometric point of view, it is in practice not exactly concentrically positioned. For instance, a sleeve-shaped device 6 may be "loosely" hanging around a horizontally oriented pipe 3.

Many different shapes are possible. The device 6 may be such that the gas-entrance space 7 comprises volume parts which are at tangential distances situated within an annularly-shaped volume. This has the advantage that the device 6 will around its circumference be heated up by hot gas and be able to fix itself rapidly at many positions at a surface which the device is locally facing.

It is as shown in FIGS. 31 and 33 also possible that device 6 is such that the gas-entrance space 7 comprises volume parts which are situated at radial distances within an annularly-shaped volume. This also applies for instance to the embodiment shown in FIG. 32. The embodiment shown in FIG. 33 may be a single part, but also a multiple part device. Although each device 6 is concentrically positionable around pipe 3, the parts 15 of device 6 are not necessarily having rounded features. Although the embodiment of the device 6 as shown in FIG. 31 comprises arched parts, it is also possible that each part 5a, 5b is in a relaxed state flat and bendable for insertion into an annular space between the pipe 3 and inner wall 2 of conduit 1.

It has turned out that a fire-stop system 5 according to the invention can equally be applied in a situation where instead of the single pipe 3 referred to hereinabove, a single bundle 33 of pipes 3 is present. FIG. 34 shows such an application. Each of the pipes 3 of the bundle 33 is a relatively, thermally weakenable pipe 3. The pipes 3 are preferably tightly bundled to avoid large gaps in the bundle 33 between the pipes 3. Although only one figure, namely FIG. 34 shows such a bundle 33, it is pointed out that in each of the other figures the single pipe 3 can be replaced by a single bundle 33 of pipes 3.

It is not inconceivable that the pipe 3 is effectively, for instance, a chilled waterline and as such provided with insulating material 35, such as armaflex, as schematically shown in FIG. 35 (the insulation material 35 is for the sake of clarity shown as a thick layer which is in reality not necessarily the case).

The invention is not limited to the examples described hereinabove. The gas-entrance space 7 can be formed by many different shapes of the device 6, and/or parts of the device 6. Preferably, the gas-entrance space 7 has the shape of an annular slit, preferably with a gap size as indicated above. A skilled person can easily work out the optimal size of the gas-entrance space, as relevant for the type of conduit 1 and the dimensions of pipe 3 and conduit 1. It will be clear that it should not be too large, so that the device 6 will not be able to fix itself within the conduit 1, but also not too small or narrow. The volume of hot gas that will enter the gas-entrance space 7 should be sufficient to allow for heating up of the surface of the device 6.

Although the pipes and the conduits have all been shown as cylindrical in shape, it is not inconceivable that conduits and/or pipes have shapes deflecting from this ideal shape.

It will be clear from the foregoing that the device 6 of system 5 is, in use, preferably fully cylindrical without any parts extending only locally along the axial direction to a large extent into the radial direction. In other words, preferably each radial cross section along the axis of the device 6, as used, is similar, if not identical, to any other radial cross section along the axis.

The ends of the device 6 are, in use, preferably the same. Such symmetry of the system reflects the fact that a fire can occur at either end, and it is often not at all predictable at which end a fire is more probable.

The device 6 which is part of the system according to the invention is preferably extrudable, which is also a further advantage of the geometric preferences outlined directly hereinabove. This does not necessarily mean that it is economically viable to extrude each embodiment of such a device 6. The extrudability rather characterizes the geometry of the device 6. That is, the device 6 is from a geometric point of view extrudable.

It should furthermore be borne in mind that it is not necessarily the case that a pipe already extends through a conduit before system 5 is applied in the conduit. It is very well possible that first the device 6 is positioned in the conduit and that only after that the pipe 3 will be inserted into the conduit 1. preferably, the device 6 is in such a case "clamped" against the inner wall 2 of conduit 1. The material of which the device 6 is made is preferably a fire-retardant material. For fire-retardant rubbery-like materials, reference is made to WO 01/09538 and references mentioned therein.

All such variants and modifications are understood to fall within the scope of the invention, as defined by the attached claims.

The invention claimed is:

1. A rigid and thermally stable conduit having an inner wall defining an inner space through which a single pipe or a single bundle of pipes extends, each pipe being a, relatively, thermally weakenable pipe having an outer wall, wherein the inner space includes a system comprising at least a thermally expandable device which includes at least one component having a non-linear thermal expansion characteristic, wherein the device has surfaces which start melting at a temperature under a lowest end of a temperature-range in which the device displays a non-linear expansion characteristic which surfaces then form a sticky material, the device being made of a vulcanizable compound having a predetermined shape, the device being positioned concentrically relative to the inner space for concentrically surrounding the pipe or the single bundle of pipes, and such that:

a gas-entrance space is located between the device and the inner wall of the conduit, between the outer wall of the pipe or outer walls of the single bundle of pipes and the device, or through the device and is configured to allow hot gas to enter the gas-entrance space whereby the sticky material is formed at the surfaces of the device and the device is firmly fixed within the conduit before onset of the non-linear thermal expansion of the device.

2. A conduit according to claim 1, wherein the device is provided with a number of spacers for providing the entrance space into which the gas can freely enter.

3. A conduit according to claim 1, wherein the device is provided with a number of channels into which the gas can freely enter.

4. A conduit according to claim 1, wherein the device is a multi-part device.

5. A conduit according to claim 4, wherein the device comprises parts which are radially spaced apart.

6. A conduit according to claim 1, wherein the device is a wrappable device.

7. A conduit according to claim 1, wherein the entrance space comprises volume parts which are at tangential distances situated within an annular-shaped volume.

8. A conduit according to claim 1, wherein the entrance space comprises volume parts which are at radial distances situated within an annular-shaped volume.

9. A conduit according to claim 1, wherein the device has substantially the shape of a sleeve.

10. A conduit according to claim 1, wherein the vulcanizable rubber-like compound is based on an Ethyl Vinyl Acetate polymer (EVA).

11. A conduit according to claim 1, wherein the at least one compound comprises a heat expandable graphite.

12. A conduit according to claim 1, wherein the compound comprises at least a first type of an expanding agent and a second type of an expanding agent, wherein the first type starts expanding at a temperature that is lower than a temperature at which the second type starts expanding.

13. A conduit according to claim 1, wherein only one end of the conduit is provided with a sealing, the sealing comprises a sealant layer having a thickness of more than 15 mm.

14. A conduit according to claim 1, wherein at least one end of the conduit is provided with a sealing, the sealing comprises a sealant layer having a thickness of about 5 mm or less, so that upon exposure to a nearby fire hot gas can still enter from outside the conduit the gas-entrance space before onset of the non-linear expansion of the device.

15. A conduit according to claim 1, wherein the conduit has an inner wall substantially made of a relatively low heat conductivity.

16. A conduit according to claim 15, wherein the inner wall comprises at least one of stone and concrete.

17. A conduit according to claim 1, wherein the conduit has an inner wall substantially made of a relatively high heat conductivity.

18. A conduit according to claim 17, wherein the inner wall comprises one of steel and brass.

19. A conduit according to claim 1, wherein the device is an extrusion.

20. A method for providing a fire-stop in a rigid conduit having an inner wall defining an inner space through which a single pipe or a single bundle of pipes extends, or will extend, each pipe being a thermally weakenable pipe having an outer wall, wherein the method includes:

positioning in the inner space a thermally expandable device which includes at least one component having a non-linear thermal expansion characteristic, wherein the device has surfaces which start melting at a temperature under a lowest end of a temperature range in which the device displays its non-linear expansion characteristic and which then form a sticky material, the device being made of a vulcanizable compound having a predetermined shape;

positioning the device concentrically relative to the inner space for concentrically surrounding the pipe or the bundle of pipes; and positioning the device such that:

a gas-entrance space is located between the device and the inner wall of the conduit, between the outer wall of the pipe or outer walls of the bundle of pipes and the device, or through the device and is configured to allow hot gas to enter the gas-entrance space whereby the sticky material is formed at the surfaces of the device and the device is firmly fixed within the conduit before onset of the non-linear thermal expansion of the device.

21. The method according to claim 20, further comprising applying at at least one end of the conduit a sealing which comprises a sealant layer.

22. The method according to claim 21, wherein applying a sealing comprises applying a sealant layer at only one end of the conduit and to a layer thickness of more than 15 mm.

23. The method according to claim 21, wherein applying a sealing comprises applying a sealant at at least one end of the conduit and to a layer thickness of about 5 mm or less, so that upon exposure to a nearby fire hot gas can still enter from outside the conduit through the gas-entrance space before the onset of the non-linear expansion of the device.

24. The method according to claim 20, wherein the device is an extrusion.

* * * * *